(12) United States Patent
John

(10) Patent No.: US 10,949,851 B2
(45) Date of Patent: Mar. 16, 2021

(54) FRAUD DETERRENCE FOR PAYMENT CARD TRANSACTIONS

(71) Applicant: Michael Sasha John, Larchmont, NY (US)

(72) Inventor: Michael Sasha John, Larchmont, NY (US)

(*) Notice: Subject to any disclaimer, the term of this patent is extended or adjusted under 35 U.S.C. 154(b) by 200 days.

(21) Appl. No.: 15/404,184

(22) Filed: Jan. 11, 2017

(65) Prior Publication Data

US 2017/0124571 A1 May 4, 2017
US 2018/0165682 A9 Jun. 14, 2018

Related U.S. Application Data

(63) Continuation of application No. 14/873,165, filed on Oct. 1, 2015, now abandoned, which is a continuation (Continued)

(51) Int. Cl.
*G06Q 20/40* (2012.01)
*G06Q 30/06* (2012.01)
(Continued)

(52) U.S. Cl.
CPC ......... *G06Q 20/4016* (2013.01); *G06F 21/32* (2013.01); *G06F 21/35* (2013.01); *G06F 21/606* (2013.01); *G06F 21/6263* (2013.01); *G06Q 20/123* (2013.01); *G06Q 20/382* (2013.01); *G06Q 20/405* (2013.01); *G06Q 20/409* (2013.01); *G06Q 20/4012* (2013.01); *G06Q 20/40145* (2013.01); *G06Q 20/425* (2013.01); *G06Q 30/06* (2013.01);
(Continued)

(58) Field of Classification Search
None
See application file for complete search history.

(56) References Cited

U.S. PATENT DOCUMENTS 7,111,789 B2 * 9/2006 Rajasekaran .......... G06Q 20/02
235/472.01
7,207,058 B2 * 4/2007 Barrett .................... G06F 21/33
726/4

(Continued)

OTHER PUBLICATIONS

If your phone rings—answer it. it could be eBay calling.; UnWired buyer's mobile notification and transaction solution powers new eBay alerts service. (Jun. 14, 2006). PR Newswire Retrieved from https://dialog.proquest.com/professional/docview/447632768?accountid=131444 on Oct. 2, 2020 (Year: 2006).*

*Primary Examiner* — Kito R Robinson
(74) *Attorney, Agent, or Firm* — Brooks Kushman P.C.

(57) ABSTRACT

Systems and methods are described for providing fraud deterrents during payment card transactions especially for e-commerce and e-transactions. Fraud deterrents may be selected and configured by a client, bank, or other third-party and provided to a client in customized manners which may be configured on a client's authorized device or otherwise as defined in an e-profile associated with a payment card. Fraud deterrent options may be contingent upon transaction features including a client's profile, transaction value, or other preferences. The deterrent features may be customized by the client and include use of conceptual passwords.

19 Claims, 17 Drawing Sheets

Related U.S. Application Data of application No. 13/286,211, filed on Oct. 30, 2011, now abandoned, which is a continuation-in-part of application No. 12/124,144, filed on May 20, 2008, now Pat. No. 10,853,855, and a continuation of application No. 12/115,538, filed on May 5, 2008, now Pat. No. 8,078,515.

(60) Provisional application No. 60/980,498, filed on Oct. 17, 2007, provisional application No. 60/977,375, filed on Oct. 4, 2007, provisional application No. 60/939,066, filed on May 20, 2007, provisional application No. 60/915,934, filed on May 4, 2007.

(51) Int. Cl.
*G06F 21/60* (2013.01)
*G06F 21/35* (2013.01)
*G06F 21/32* (2013.01)
*G06F 21/62* (2013.01)
*G06Q 40/00* (2012.01)
*G06Q 20/42* (2012.01)
*G06Q 20/12* (2012.01)
*G06Q 20/38* (2012.01)

(52) U.S. Cl.
CPC ..... *G06Q 30/0601* (2013.01); *G06Q 30/0613* (2013.01); *G06Q 40/00* (2013.01)

(56) References Cited

U.S. PATENT DOCUMENTS

| | | | | |
|---|---|---|---|---|
| 7,312,712 | B1* | 12/2007 | Worrall | G06Q 10/06 340/573.4 |
| 7,499,889 | B2* | 3/2009 | Golan | G06Q 20/04 705/40 |
| 7,552,467 | B2* | 6/2009 | Lindsay | G06F 21/31 726/5 |
| 7,600,676 | B1* | 10/2009 | Rados | G06Q 20/40 235/380 |
| 7,610,219 | B2* | 10/2009 | Sayed | G06Q 30/0641 705/26.2 |
| 7,610,390 | B2* | 10/2009 | Yared | G06F 21/41 709/227 |
| 8,271,395 | B2* | 9/2012 | Dominguez | G06Q 20/02 705/65 |
| 8,280,979 | B2* | 10/2012 | Kunz | G06Q 30/0603 709/218 |
| 8,423,466 | B2* | 4/2013 | Lanc | G06Q 20/40 705/44 |
| 8,572,701 | B2* | 10/2013 | Rathbun | H04L 63/18 726/6 |
| 8,775,284 | B1* | 7/2014 | Crook | G06Q 30/06 705/35 |
| 9,594,921 | B2* | 3/2017 | Cheng | H04L 63/083 |
| 9,819,669 | B1* | 11/2017 | Golwalkar | H04L 63/0218 |
| 9,977,881 | B2* | 5/2018 | Mathew | G06F 21/31 |
| 2001/0049636 | A1* | 12/2001 | Hudda | G06Q 30/0601 705/26.1 |
| 2002/0073416 | A1* | 6/2002 | Ramsey Catan | H04N 21/4415 725/6 |
| 2002/0095386 | A1* | 7/2002 | Maritzen | G06Q 20/3572 705/64 |
| 2002/0116333 | A1* | 8/2002 | McDonnell | G06Q 20/4037 705/40 |
| 2002/0123938 | A1* | 9/2002 | Yu | G06Q 30/0617 705/26.43 |
| 2002/0128977 | A1* | 9/2002 | Nambiar | G06Q 20/388 705/64 |
| 2002/0184500 | A1* | 12/2002 | Maritzen | G07F 17/3255 713/170 |
| 2002/0191816 | A1* | 12/2002 | Maritzen | G06Q 20/341 382/115 |
| 2003/0042301 | A1* | 3/2003 | Rajasekaran | G06Q 20/02 235/380 |
| 2003/0055785 | A1* | 3/2003 | Lahiri | G06Q 20/105 705/41 |
| 2003/0096596 | A1* | 5/2003 | Sini | G06Q 20/363 455/412.1 |
| 2003/0101134 | A1* | 5/2003 | Liu | G06Q 20/12 705/39 |
| 2003/0164851 | A1* | 9/2003 | Smith | G06F 16/9535 715/741 |
| 2003/0172085 | A1* | 9/2003 | Rajasekaran | G06F 16/9014 |
| 2004/0187009 | A1* | 9/2004 | Ebata | H04L 67/02 713/185 |
| 2004/0210536 | A1* | 10/2004 | Gudelj | G07F 19/206 705/64 |
| 2004/0268154 | A1* | 12/2004 | Ullrich | G06F 21/31 726/4 |
| 2005/0119971 | A1* | 6/2005 | Zito | G06Q 40/025 705/40 |
| 2006/0212407 | A1* | 9/2006 | Lyon | G06Q 20/4016 705/71 |
| 2006/0218083 | A1* | 9/2006 | Bruer | G06Q 20/10 705/39 |
| 2006/0235789 | A1* | 10/2006 | Koch | G06Q 30/06 705/39 |
| 2006/0235796 | A1* | 10/2006 | Johnson | G06Q 20/32 705/44 |
| 2007/0027807 | A1* | 2/2007 | Bronstein | G06Q 40/00 705/44 |
| 2007/0175992 | A1* | 8/2007 | Brown | G06Q 30/0603 235/385 |
| 2007/0198432 | A1* | 8/2007 | Pitroda | G06F 21/606 705/64 |
| 2007/0219901 | A1* | 9/2007 | Garbow | G06Q 30/0623 705/39 |
| 2008/0015987 | A1* | 1/2008 | Ramavarjula | G06Q 40/00 705/44 |
| 2008/0072311 | A1* | 3/2008 | Mullick | H04L 67/1008 726/15 |
| 2008/0126251 | A1* | 5/2008 | Wassingbo | G06Q 20/3224 705/44 |
| 2008/0255992 | A1* | 10/2008 | Lin | G06Q 20/403 705/44 |
| 2008/0284642 | A1* | 11/2008 | Seacat | G01S 19/42 342/357.25 |
| 2008/0288299 | A1* | 11/2008 | Schultz | G06Q 20/4014 705/4 |
| 2008/0288405 | A1* | 11/2008 | John | G06Q 20/40 705/44 |
| 2008/0306877 | A1* | 12/2008 | Mandeles | G06Q 30/06 705/76 |
| 2008/0318550 | A1* | 12/2008 | DeAtley | H04L 63/08 455/411 |
| 2009/0106151 | A1* | 4/2009 | Nelsen | G06Q 20/405 705/44 |
| 2009/0167487 | A1* | 7/2009 | Shah | H04L 9/3215 340/5.2 |
| 2009/0248583 | A1* | 10/2009 | Chhabra | G06Q 20/382 705/76 |
| 2009/0265776 | A1* | 10/2009 | Baentsch | H04W 12/0608 726/9 |
| 2010/0005029 | A1* | 1/2010 | Nelsen | G06Q 20/4016 705/76 |
| 2010/0211792 | A1* | 8/2010 | Ureche | H04L 63/102 713/176 |
| 2010/0287099 | A1* | 11/2010 | Liu | G06Q 20/4016 705/44 |
| 2011/0016051 | A1* | 1/2011 | Trifiletti | G06Q 20/401 705/44 |
| 2011/0047606 | A1* | 2/2011 | Blomquist | G06F 21/41 726/7 |
| 2011/0137789 | A1* | 6/2011 | Kortina | G06Q 40/025 705/38 |
| 2011/0246374 | A1* | 10/2011 | Franz | G06Q 20/3227 705/77 |

(56) References Cited

U.S. PATENT DOCUMENTS

| | | | |
|---|---|---|---|
| 2011/0270763 A1* | 11/2011 | Graham, III | G06Q 20/3829 |
| | | | 705/71 |
| 2011/0307381 A1* | 12/2011 | Kim | G06Q 20/40 |
| | | | 705/44 |
| 2012/0144034 A1* | 6/2012 | McCarty | H04L 67/16 |
| | | | 709/225 |
| 2012/0192258 A1* | 7/2012 | Spencer | H04W 12/003 |
| | | | 726/7 |
| 2012/0209733 A1* | 8/2012 | Pelegero | G06Q 20/40 |
| | | | 705/21 |
| 2013/0089848 A1* | 4/2013 | Exeter | G09B 7/00 |
| | | | 434/350 |
| 2013/0278622 A1* | 10/2013 | Sun | G06Q 20/3276 |
| | | | 345/589 |
| 2014/0165150 A1* | 6/2014 | Brunswig | H04L 63/0815 |
| | | | 726/4 |
| 2014/0359738 A1* | 12/2014 | Nakajima | H04W 12/06 |
| | | | 726/7 |
| 2016/0248781 A1* | 8/2016 | Grigg | G06Q 40/02 |

* cited by examiner

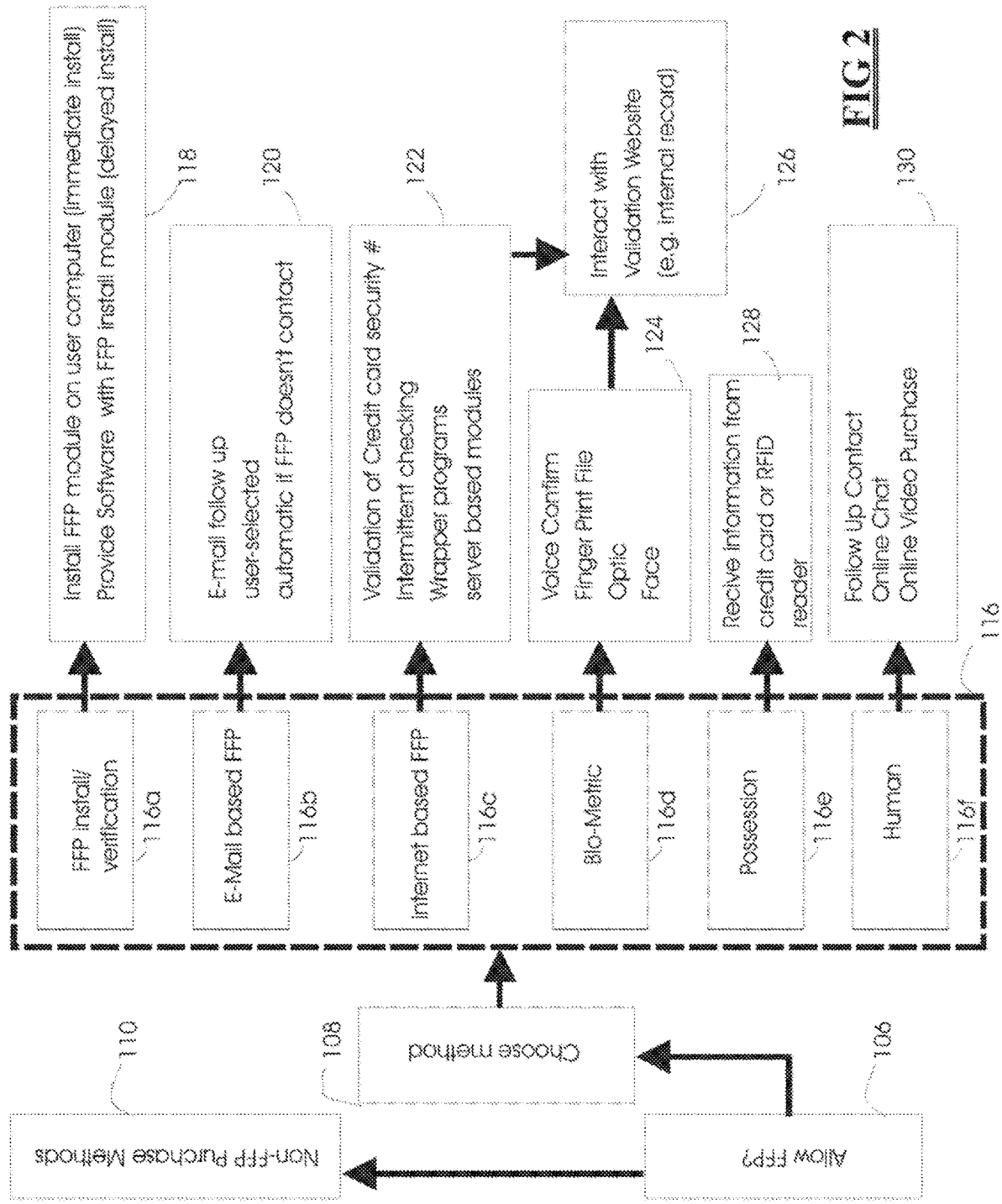

Table 1: Client Side FFT-Purchase History Table

| Product ID | Price | Purchase Date | Seller ID | Client ID | FFT Verify | License | Payment |
|---|---|---|---|---|---|---|---|
| MS-Office Ver.2007a | 45.89 | 01/10/05 | FFP-104 | FFP-304 | Complete | AH-784... | Visa (4862) |
| DrawItNow Ver. 10.1 | 438.24 | 06/23/06 | FFP-104 | FFP-304 | [30, 60] Complete | S804-98... | PayPal ID |
| D Mathews Greatest Hits 2007 | 44.99 | 02/04/07 | FFP-328 | FFP-304 | 45 Active | Jj823s... | Visa (4862) |

Table 2: FFT-Server Side Transaction Profile Tables

| Client Profile | Parameter value | Status |
|---|---|---|
| Credit card | Visa | 0 |
| Name | Tom Gartner | 0 |
| Region | Alaska | 2 |
| # rejections | 24 hours | 0 |
| Internet Profile | Parameter value | Status |
| Connection | Proxy | 0 |
| Transition Speed | Slow | 0 (1-8) faster |
| Transition distance | Local | 1 (0=too far) |
| reverse DNS validation | Integrity checks passed | 0 (1 =failed so flagged) |
| Manufacturer | Parameter value | Status |
| Price | 500 | 2 (authentication level) |
| Preference | Phone | 1 (-1=don't use, 0=no pref, 1=preferred, 2=must use). |
| Seller | Parameter value | Status |
| Price | 500 | 2 (authentication level) |
| Preference | Phone | 1 (-1,0,1,2). |
| Item | Parameter value | Status |
| Price | 500 | 2 (authentication level) |
| Product | Upgrade | 1 (-1,0,1,2). |

FIG3A

Table 3: Server Side FFT-Operating Parameter Table

| Operating Condition | Default | Product1 ID=1234 | Product2 ID=4321 | Condition1 | Condition2 |
|---|---|---|---|---|---|
| Transaction profile | | | | | |
|    Client Profile | 1 | 0 | 0 | 1 | 1 |
|    Seller Profile | 0 | 0 | 0 | 0 | 1 |
|    Item Profile | 1 | 1 | 1 | 1 | 0 |
|    Manufacturer profile | 0 | 1 | 1 | 0 | 0 |
| Fraud deterrent strength (FDS) | 1 | 1 | 2 | 2 | 3 |
| Random selection | 0 | 0 | 0 | 1 | 0 |
| Propose to user | 2 | 0 | 3 | 2 | 1 |
| Number of Deterrents | 1 | 2 | 2 | 2 | 1 |
| Fraud Deterrents | | | | | |
|    FFP software module installation. | 1 | 1 | 1 | 1 | 0 |
|    FFP software module verification. | 0 | 0 | 0 | 1 | 0 |
|    FFP e-mail implementation. | 1 | 1 | 1 | 1 | 0 |
|    Human Interaction (Online Purchase via multi-media or phone-based purchase) | 0 | 0 | 0 | 1 | 1 |
|    Online validation service. | 0 | 0 | 1 | 1 | 0 |

Table 4: Trusted and un-trusted FFT information

| UnTrusted | Trusted |
|---|---|
| orders on client computer which match orders on FFT server | orders on client computer which match orders on FFT server |
| Orders shipped to same computer ID | Orders shipped to same computer ID (and ID #) |
| Orders shipped to same software serial ID | Orders shipped to same software serial ID (and ID number) |
| Orders with same shipping address | Orders with same shipping address (and list of any other addresses as well) |
| Orders with same billing address | Orders with same billing address (and list of any other addresses as well) |
| # orders in last 12 months | # orders in last 12 months as well as when, how much, etc. |
| # rejects | # rejects and (with what seller) |
| # chargebacks | # chargebacks and details |

FIG3B

Welcome to VISA: view/adjust e-profile screen

- ⦿ View/modify Shipping Addresses
- ○ View/modify Billing Addresses
- ○ View/modify computer ID info
- ○ View/modify e-limits and rules
- ○ View/modify Credit info limits and users

[ Back ] 260A    [ Continue ] 260B

Fig 9B 266

Welcome to VISA: Confirm/Make e-Payment Screen

| | | Oder # | Transaction date | Amount | Description | Seller |
|---|---|---|---|---|---|---|
| Accept | Reject | #22242-A1 | June 17, 2007 | $250 | i-Pod nano | E-bidder.com |
| Accept | Reject | #12542-JK | June 18, 2007 | $150 | Airline ticket | E-traveler.com |

270  272  274

Enter Code # [_____] 276    Enter Amount [_____] 278

[ Confirm Payment ] 280

[ View History ] 260C   [ Back ] 260A   [ Continue ] 260B

Fig 9C 268

Example of Fraud-Free Transaction Use: Conceptual Password
FIG 10C

FRAUD DETERRENCE FOR PAYMENT CARD TRANSACTIONS

This application is a continuation of U.S. Ser. No. 14/873,165 filed Oct. 1, 2015 entitled "Fraud Deterrence for Electronic Transactions", now abandoned, and is a continuation-in-part of U.S. Ser. No. 12/124,144, filed May 20, 2008, now U.S. Pat. No. 10,853,855, issued Dec. 1, 2020. Said U.S. Ser. No. 14/873,165, filed Oct. 1, 2015 is a continuation of U.S. Ser. No. 13/286,211 filed Oct. 31, 2011 entitled "Fraud Deterrence for Electronic Transactions", which is a continuation of U.S. application Ser. No. 12/115,538, filed May 5, 2008 now U.S. Pat. No. 8,078,515, issued Dec. 13, 2011, and entitled "Systems and methods for facilitating electronic transactions and deterring fraud", which claims the benefit of U.S. provisional applications: 60/915,934 filed on May 4, 2007; 60/939,066 filed on May 20, 2007; 60/977,375 filed on Oct. 2, 2007 and 60/980,488 filed on Oct. 17, 2007.

DESCRIPTION & BACKGROUND

This invention is in the fields of e-commerce transactions and preventing or deterring fraudulent activity.

The selling of products using both conventional shipping as well as by electronic download is suboptimal from the seller's point of view due to a number of issues related to fraud. A "fraudster" is a user who intends or attempts to perform illegitimate activity such as assuming a false identity, or otherwise avoiding payment for products or services offered by a seller, rather than being a user who is a legitimate client. Fraudsters use many types of strategies to attempt fraud over the internet.

One type of fraudster strategy is to provide the seller with credit card information that is stolen in the case of a payment made by a credit card, that was issued by a credit card issuing bank, for a downloadable software product, or a physical product, the selling company may have to refund to the issuing bank or a card association an amount equal to the payment made for the product. In the case of a downloadable software product, if a seller must also pay a software company, for which it is acting as a distributor, that the seller will often experience a financial loss, which is often regarded as a 'cost of doing business'. If the seller and the software company are the same entity, although they will not have a loss, the company will have failed to realize a profit from a valid sale of a product.

Software vendors have developed a number of strategies in order to decrease financial loss due to fraudulent activity. For example, license software modules' may be distributed with software and may periodically determine a current calendar date and remind the user of scheduled renewal fees which are due. The module may cause the purchased software program to stop working until such renewal fee is paid. Alternatively software may be designed to periodically establish a connection over the internet to contact a seller's server and to assess whether a license is still "active" so that a user will be allowed to continue to use the software.

These methods have a number of disadvantages. License manager software modules rely upon periodic reminders which may be realized using, for example, pop-up windows. These windows are annoying to the user. Further software engineers can create "cracks" which allow users to bypass the licensing manager by disabling it in some fashion. Software which periodically requires online communication with the seller's server, in order to operate properly, requires that the user be online which may often not be the ease. For example, the user may be on an airplane and without online access. Additionally, such online validation operations may be hindered by server outages and communication failures which hinder normal operation during this 'validation' period. Strategies which constrict the operation of software to a particular computer cause problems when computers crash and a new computer is purchased for the same user.

The creation of computer-specific software modules can require complex compilation schemes, such as real-time compilation of the source code to create an executable locked to the information of a unique computer identification number. This may be an onerous and complex solution that is not viable for smaller software manufacturers or distributors. Strategies in which software requires a hardware lock or "dongle" necessitate the additional cost of this hardware, occupy a communication port of the computer, and can be 'cracked' by software engineers. Strategies which rely upon software "wrappers" that change the executable in manners that prevent fraudulent use are problematic since software wrappers are often made by a third party and can often interfere with proper functioning of the software.

These currently implemented strategies all have a number of additional disadvantages that are overcome by features of the disclosed invention. For example, these methods and systems are all oriented towards deterring unauthorized use of the software, or are aimed at promoting licensing renewal, rather than deterring fraud during the point of sale process itself. These strategies do not utilize any information about the client, by way of accessing a client history or online client profile (from an online profile website, an online verification website, or a well established site such as E-Bay or PayPal which contain such a profile). These strategies do not implement fraud prevention strategies which have security measures, the strength of which are selected based upon the value of the digital product being purchase, the history of purchases by a user, or other aspect of a users electronic profile. These strategies put a large burden on the software provider, to incorporate fraud-deterrent mechanisms into the software product, rather providing the distributor or 'seller', or card issuing bank or card association, with mechanisms for deterring fraudsters both at point of sale and subsequently thereafter. The disclosed invention is pertinent to selling of non-electronic products, software, digital media, distribution, use, and rights management and e-commerce in general. The disclosed features are also relevant to establishing and protecting a client's valid identity and profile.

SUMMARY OF THE INVENTION

Measures, features, and strategies for deterring fraud during electronic commerce operations are disclosed. The technology may be used during the purchasing of digital and physical products, and at later times during their subsequent use. Deterring the purchase or acquisition of software and digital media by a fraudster is a primary feature of the invention. Identifying a potential fraudster and differentially handling the transaction or even prohibiting the electronic transaction may also occur. Electronic transactions can also include online banking, obtaining online access to goods and services, as well as other types of transactions for which online identity is relevant. Electronic transactions can be termed 'e-transactions', electronic profiles can be termed 'e-profiles', and the 'e-' prefix generally indicates that the entity can or is electronically-realized via a computer, interact, or the like.

In one aspect of the invention the fraud prevention deterrents are selectively and automatically implemented, or automatically proposed, during the sale of a digital product based upon a user's electronic profile. The particular fraud prevention deterrents that are implemented or proposed can also be selected based upon the value of the item being purchased, a seller's deterrence preference, a random assignment, a user's recent web activity, a user's electronic profile, a user's preference, and any aspect of a referring website by which the user arrived at the seller's website.

In another aspect of the invention at least one fraud prevention deterrent is proposed to the user during one step of the sale method assigned for a digital product. This may occur as a pop-up window, one or more check-boxes, or as part of the checkout process, for example, a process implemented by an electronic shopping cart.

In another aspect of the invention at least one fraud prevention deterrent is proposed to the user during the sale of a digital product and if the user does not opt to allow this deterrent then selected "non-participation" operations occur. Additionally, the user may be informed as to the nature of these—non-participation operations (e.g., the product will not be shipped until after a delay interval has occurred, more extensive questionnaires may be required for the transaction to be successfully completed). One deterrent which can be proposed is joining or participating in an online fraud deterring service or community.

In another aspect of the invention at the user is automatically prompted to choose at least one from at least two fraud prevention deterrent options during the sale of a digital product.

In another aspect of the invention fraud prevention deterrents are implemented during the sale of a digital product comprising a fraud free transaction FFT) software script that is run or at least transiently installed on the client's computer as part of the electronic transaction ('client side FFP operations').

In another aspect of the invention the fraud prevention deterrents are implemented during the sale of a digital product in the form a fraud free transaction (FFT) e-mail program. Further, the FFT e-mail program can contain parameters that are adjusted as part of the electronic transaction ('server side FFP operations') such as sending a reminder e-mail, or sending a reminder e-mail if FFP client side program doesn't initiate contact suggesting possible removal by fraudster.

In another aspect, the fraud prevention deterrents are selected and adjusted during the e-commerce transaction (and may occur automatically or by a user). The deterrents can be selected using a fraud deterrent strength para which can be increased (e.g., if the risk of fraud, or cost of fraud, increases) so that the deterrents are also stronger. Such a strong deterrent may incorporate evaluation of biometric markers as part of the e-commerce operation automatically/ by user.

In another aspect, the fraud prevention deterrents incorporate validation services and websites which are selected, and adjusted during the e-commerce operation.

In another aspect, the fraud prevention deterrents incorporate operations which are dictated, allowed, rejected, and adjusted based upon preferences and information defined in a user's e-profile. A user can modify the e-profile in order to provide validation and verification operations, historical activity, and other types of information which may be required by a seller for successful completion of an electronic transaction.

The inventive features disclosed can be applied prior to the electronic transactions, during the electronic transactions, subsequent to a time of purchase, or a combination of these times.

A conceptual password technology, which may rely upon a grid of images, movies, pictures, and/or text can be created and customized by a user, a user's bank, a card association, and/or a third party user validation service.

These and additional features and advantages of the invention will be further described in the following figures and detailed description of the current invention. Further, the understanding exists that the specific embodiments are illustrative of the innovative features and are not meant to be limiting with respect to implementation and practice.

BRIEF DESCRIPTION OF THE DRAWINGS

For the purpose of illustrating the invention and its advantages, there is provided a detailed description and accompanying drawings of preferred embodiments of the invention. In illustrations of methods, when arrows indicate iteration (a return from later steps to prior steps), this iteration is understood to be a preferred embodiment, and executing the steps a single time may also be an option. In the illustration of methods, steps which occur sequentially may also occur concurrently, in parallel, may be repeated several times (e.g., in order to obtain an estimation of a measure by computing a statistic such as the mean value, or until an operation within a step occurs successfully), or may be merged with other steps, prior to the next step occurring. In illustrations of systems, when lines contain arrow heads on both ends, this signifies that information may regularly navel in both directions, it is understood that the invention is not intended to be limited to the precise arrangements and instruments shown, wherein:

FIG. 2. illustrates a schematic representation of an operating platform configured for adjusting which among several types of fraud deterrents will be implemented as part of an electronic transaction.

FIG. 3A shows Table 1 associated with a client's historical table which can reside on the client's computer and the FFT-server, as well as Table 2 which is a FFT-server side table representing a e-transaction profile.

FIG. 3B shows Table 3 a FFT-server side table representing the FFT server operating parameters that are tailored and customized to each client, as well as Table 4 showing an excerpt of illustrative methods where FFT information is used to select warnings and alerts or other operations, according to a trusted pool of transactions.

FIG. 48 shows a preferred embodiment of a conceptual password manager screen.

FIG. 9B. shows a web-interface in which clients can dynamically accept or reject e-transactions such as e-purchases.

FIG. 9C. shows a web-interface which allows clients to modify aspects of their e-profile including shipping and billing addresses and customize rules for accepting or rejecting e-transactions such as e-purchases.

FIG. 10C. illustrates an example of an FFT-client side application of a conceptual password.

DETAILED DESCRIPTION OF THE INVENTION

Figure 1A:
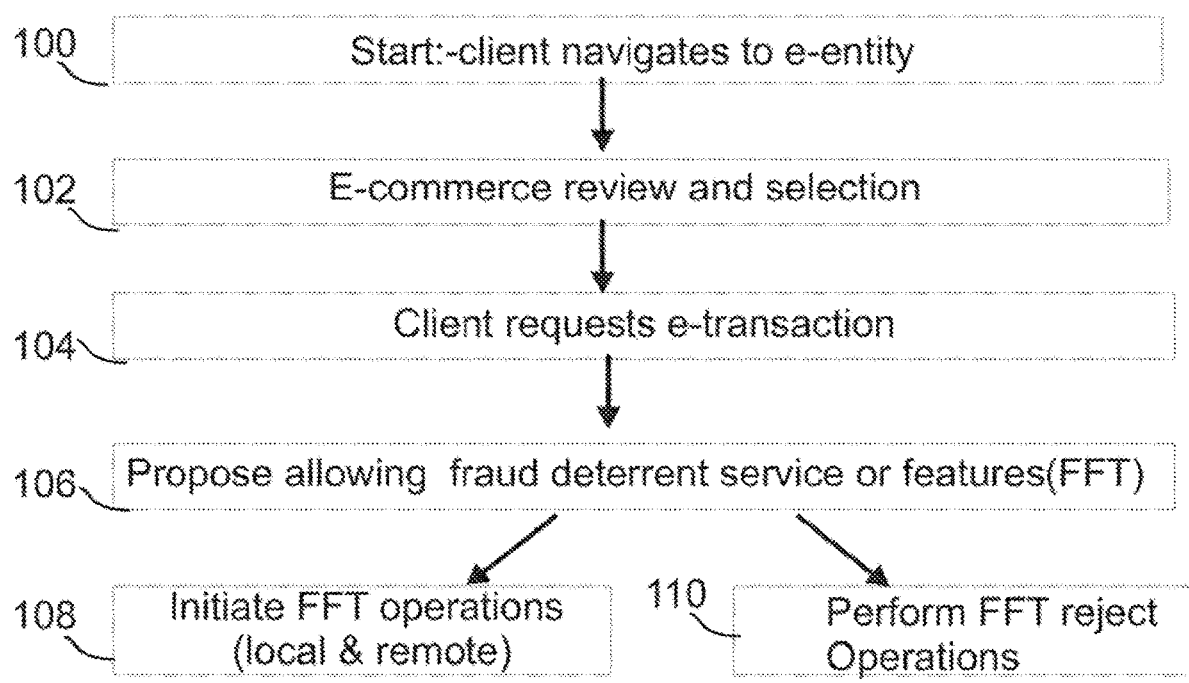
FIG. 1A illustrates a schematic representation of a method of modifying, an electronic transaction according to user selected fraud deterrents.

FIG. 1A shows a schematic illustration of an embodiment of a method of providing a "fraud free transaction" (FFT) or "fraud-free purchase (FFP). In this example, an e-transaction is modified according, to fraud deterrents which are automatically selected, or client selected, after items and services are selected by the client. This may occur as part of the 'check out' process and may be integrated into a digital shopping-cart feature. Alternatively, this may occur when the client enters a website or at another time or in response to a particular action by the client such as entering a particular part of a website or selecting a particular product. In step 100 a client navigates to a website offering goods and services. In step 102 the client views and selects various goods and services available on the website. This may further comprise making selections, or agreements, related to terms of use as may occur in the case of digital media and services. In step 104 the client requests that the e-transaction occur wherein payment will be provided for the selected goods and services. In step 106 the seller's e-transaction server (or the server of a third party that is handling payment operations) proposes utilizing at least one FFT method as part of the checkout process. The user can choose to allow or reject selected FFT operations leading to steps 108 and 110, respectively. Steps 108 and 110 can be realized in a number of manners. An example will be shown in FIG. 2. Initiation of FFT operations 108 may entail performing 'FFT accept' operations the local server or on the user's remote computer or at both locations. For example the FFT server computer may attempt to contact the user's computer if client-side FFT software has been previously installed on it FFT reject operations 110 can include asking the client's credit-card security code (e.g., CVV) number, normally located on the back of a credit-card.

Figure 1B:
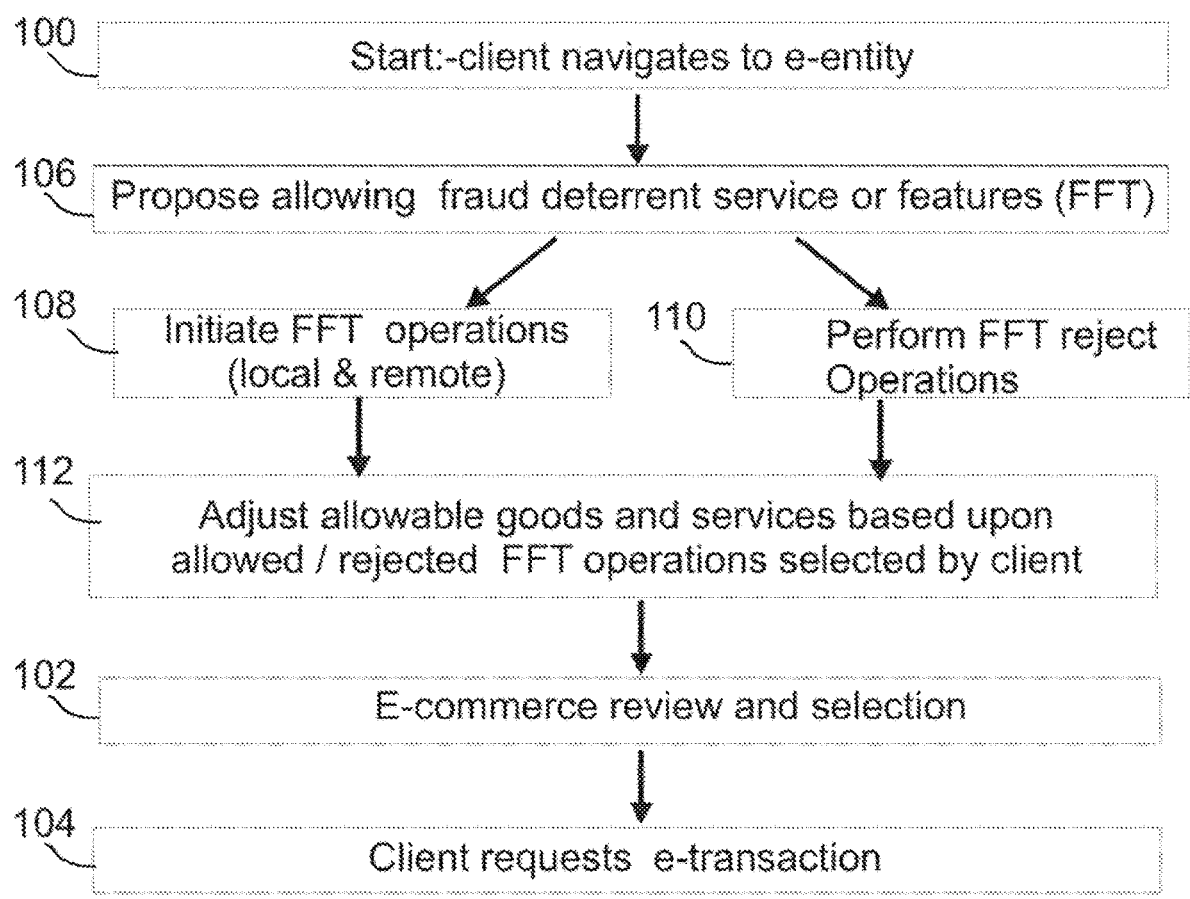
FIG. 1B illustrates a schematic representation of a method of modifying an electronic transaction according to user selected fraud deterrents wherein the deterrents which are selected by a client limit the subsequent goods and services that are offered to the client.

FIG. 1B shows a schematic illustration of an alternative embodiment of a method of providing a FFT. An e-transaction is modified according to fraud deterrents which are selected before items and services are presented to a client, i.e. as part of the 'login' process for a website. In this embodiment, upon arrival at the website 100, or soon thereafter, the client is queried about allowing one or more FFT operations. The subsequent browsing experience of the user can be adjusted 112 based upon the responses to this query, according to factors such as 1, whether FFT is generally allowed or rejected, 2, if allowed, which particular fraud deterrent options are selected, and 3, a client's fraud ranking as calculated by one or more operations which occur during the FFT process (e.g. a client's ranking on the FFT server or an acceptance to install/run client side FFT software). A customized presentation of goods and services 112 can be achieved for a client by sending the client only to selected portions of the website 102 that are configured according to a user's interaction with the FFT server (e.g. as a function of whether the client's identity was successfully validated). In another embodiment, a customized presentation of goods and services 112 can also be provided by dynamically generating web-pages containing content that is adjusted based upon the client's interaction with the FFT server. In this manner, the value or terms-of-use of items offered by the seller maybe tailored to the risk-of-fraud associated with each particular client. FIGS. 1A and 1B, illustrate FFT implementations which are primarily "front end" and "back end", respectively. Either, or both, of these variations may be used, and further, client activity may cause FFT operations to be automatically invoked during an e-transaction, in response thereto.

Utilization of Multiple/Selectable Fraud-Free Purchase Options

FIG. 2 shows a schematic illustration of an embodiment of a method of providing a 'fraud free purchase' (FFP, which is a type of fraud free transaction FFT) in which the user is provided with a number of fraud deterrent options. In step 106 the FFP server displays a query to a client about whether one or more FFP operations will be allowed to occur as part of the purchase process. The outcome of step 106 is step 110 if this request is denied, step 108 if an affirmative response is provided to this query, or step 113 (not shown) if the client chooses an option in which more information about the FFP program is provided. Provision of help and information screens is generally available during any step of the FFP process, and may be made available to the client using a graphical button which generally appears somewhere in the browser window providing, a message such as "Click here for more information". Alternatively, rather than providing the query of step 106, the shopping cart or selling process can be configured to automatically invoke, step 108, and client's are required to select FFP measures as part of the transaction. Alternatively, step 106 can be followed by step 116 if the fraud deterrents are automatically selected for users by the website or by the FFT server (e.g. based upon geographical location of user determined through reverse DNS methods).

Step 108 includes a step in which the client is presented with a menu of fraud deterrent options. This step is novel from known methods in that it proposes at least one type of fraud deterrent feature to a client and allows the client to participate in fraud prevention rather than trying to prevent fraud without the cooperation of client. Conventional methods require users to provide specific information which is used to deter fraud, rather than giving several options. Additionally, this strategy does not force the client to use a validation method for which the particular client may not be able to participate. For example, a client may not have a web-camera and so visually implemented human based interaction may not be possible, although a voice-based transaction could occur if the client's computer was configured with a microphone. The selection of menu items leads to step 116 in which at least one of a plurality of FFP deterrents 116*a*-116*f* and other technologies such as use of a special browser which is particularly configured for e-transactions, use of a user's e-profile, or use of concept-passwords), are invoked. Alternatively, step 116 can occur automatically if the seller's/banks server 8 runs an FFP server program 10 which has an FFP algorithm 12 which chooses one of the FFP options 116*a*-*f* either automatically, based upon aspects of the transaction profile (e.g., the purchase price, the purchased product, some aspect of the client's e-profile, purchase history of the client).

In step 116, if option 116*a* or 'FFP install/verify' is selected then this will lead to step 118. In step 118 FFP programs can be verified, and if not currently on a user's computer, the programs can be installed, verified, and run on the client's computer. Installation of FFP software on the client's machine can occur by concurrently installing the FFP software module at time of purchase (immediate install) or by providing the user with the FFP software as part of the software package which is downloaded. In this latter case, the FFP software will be installed when the purchased software is installed ('delayed install'). In step 116 or 118 a number of types of fraud deterrent operations may be proposed, selected, or implemented on the user's computer and these are known as "client-side FFP operations".

a. FFP software module installation. This option permits an FFP software module to be used on client machine according to selected parameters. The parameters can include the type of FFP software which is installed, the information contained, collected, and displayed by the FFP module, and the manner in which the FIT module can be used to communicate with a third party server such as the seller's FFP server. The parameters can also include times at which the FFP software module operates in intended manners such as making contact with an FFP server or removing itself from the client's computer. Rather than installing software on the user's computer, the FFP software may be configured to ask for permission to simply run as a browser module or to access information on the client's computer. The FFP module may also be installed from a third party server such as a user's bank, to which they may be redirected for this process, or a third party. The FFP module can be installed as part of another module that already exists on the client's computer. For example if a client has "Norton Antivirus" or "MacAfee virus scanner" already installed on their computer then the FFP software can be installed as a module which works with one of these engines. Additionally, the FFP software can be installed as a module that works with a client's social networking utility such as MSN-Messenger. In a preferred embodiment, the FFP software is installed on the client's computer directly from the client's bank, using the bank's online website in a process that register's the user's computer as a valid computer.

b. FFP software module verification. This option permits server-side FFP software which resides on a remote server (e.g. seller's server or bank server) to check for a previous installation of the FFP software and if this is found then to attempt to communicate with the FFP software module that has previously been installed on client's machine. If a user has previously made purchases from sellers who use the FFP-technology, then this purchase history can be stored on the client's computer and can be accessed in order to determine the client's historical activity of e-transactions. Further, the seller's server can verify the validity of this historical purchase information by cross-checking the information with other FFP servers such as the FFP servers of other sellers. For example, in Table 1 of FIG. 3, if the current seller is not listed in the FFP history table, then the seller may contact a prior seller (e.g. FFP 104) and transmit the data in the relevant row of the table to determine if the information in table is correct. The prior seller can confirm the information and also flag any transaction which resulted in a chargeback or other type of relevant information. A number of methods are disclosed (e.g. section entitled "FFP-history legitimacy checks") that can assess whether historical information of this table is valid and is not being used by a fraudster who has stolen this information from a legitimate client.

When FFT software is installed on the client's computer, it may accomplish post-transaction validation and verification operations'. For example, the FFT software may be installed as a system process which monitors the system processes and records the usage of a digital product that was downloaded. The FFT software may be configured to contact the FFT server at some future date and to report the user's activity with respect to the software usage. This feature can assist in cases where a client rejects a charge related to the purchase of software by providing evidence that the client has installed and used the software during a period such as the first 30 days after purchase. In another embodiment the FFT software may wait an approximate duration, e.g. 3 days and then request that a user confirm that they have downloaded the software and are happy with it A "yes" response allows the FFT server to communicate this to the seller, while a "no" response can result in requesting permission of the user to de-install any version of the software which exists on the client's computer and to contact the software seller. Failure of the FFT to contact the software seller is an indication that the user has de-installed the FFT program and can be used as evidence by the seller that the client intended fraud, especially in the case of a chargeback dispute.

After installation the FFT client-side application can periodically or regularly monitor currently active system processes and can create a log of the usage of the program that was downloaded. It can also check the system registry and hard-drive (using the default installation path) to detect if the software program that was downloaded is still installed. This can occur, for example, during the first week after download of a new software program. Upon arrival of a scheduled validation date, where the client-side FFT software communicates with the seller-side server, the FFT client-side application can transfer the information related to this usage. This information can be used by the seller to show either that the client is actually using the software, or that it is still installed on the client's computer, in the case of a chargeback dispute.

In step 116, if option 116*b* or "FFP e-mail implementation" is selected then step 120 occurs. Step 120 allows FFP related e-mail operations to occur according to selected parameters. These parameters can include sending a specified e-mail to an account and selecting one or more dates on which the e-mail will be sent. These parameters can also be used to adjust the content of the e-mail such as providing validation/licensing codes which can be used to keep the software running. E-mail FFP can also realize a number of additional important features:

a. In one embodiment, the e-mail can contain a hyper link to a website. The hyper link may contain information needed to identify the user and the e-product which was purchased and can cause the validation process for the purchase to be run. Unless the client clicks on the hyper link, in order to verify the purchase, the purchase is not made. This allows the FFP server to verify that the client has supplied a valid e-mail address. This e-mail can also be sent with a hyper link which when clicked indicates to the sender of the e-mail at a recurring billing charge may be implemented as accepted by the user.

b. The e-mail implementation operations may also be used to contact the client if a client-side FFP software module does not make contact with the seller's FFP-server at one or more times that were selected by the client for 'post-transaction validation and verification operations', suggesting that the client has de-installed the FFT software.

The e-mail protocol may have parameters that are adjusted as part of the electronic transaction, and can include, for example, parameters related to: when to send reminder e-mails; what to do if an e-mail is not responded to within a selected interval; the content of the e-mail which will be sent, including client ID and purchase information; and, operations related to sending reminder e-mails if a client-side FFT-program doesn't initiate contact at particular pre-set dates (suggesting possible removal by a fraudster). While step 118 disclosed some FFP client-side operations which occurred as part of the client-side FFP program 14, the implementation of the FFP e-mail operations illustrate a portion of the server-side FFP operations that are carried out by the server-side FTP program 222.

Figure 9A:
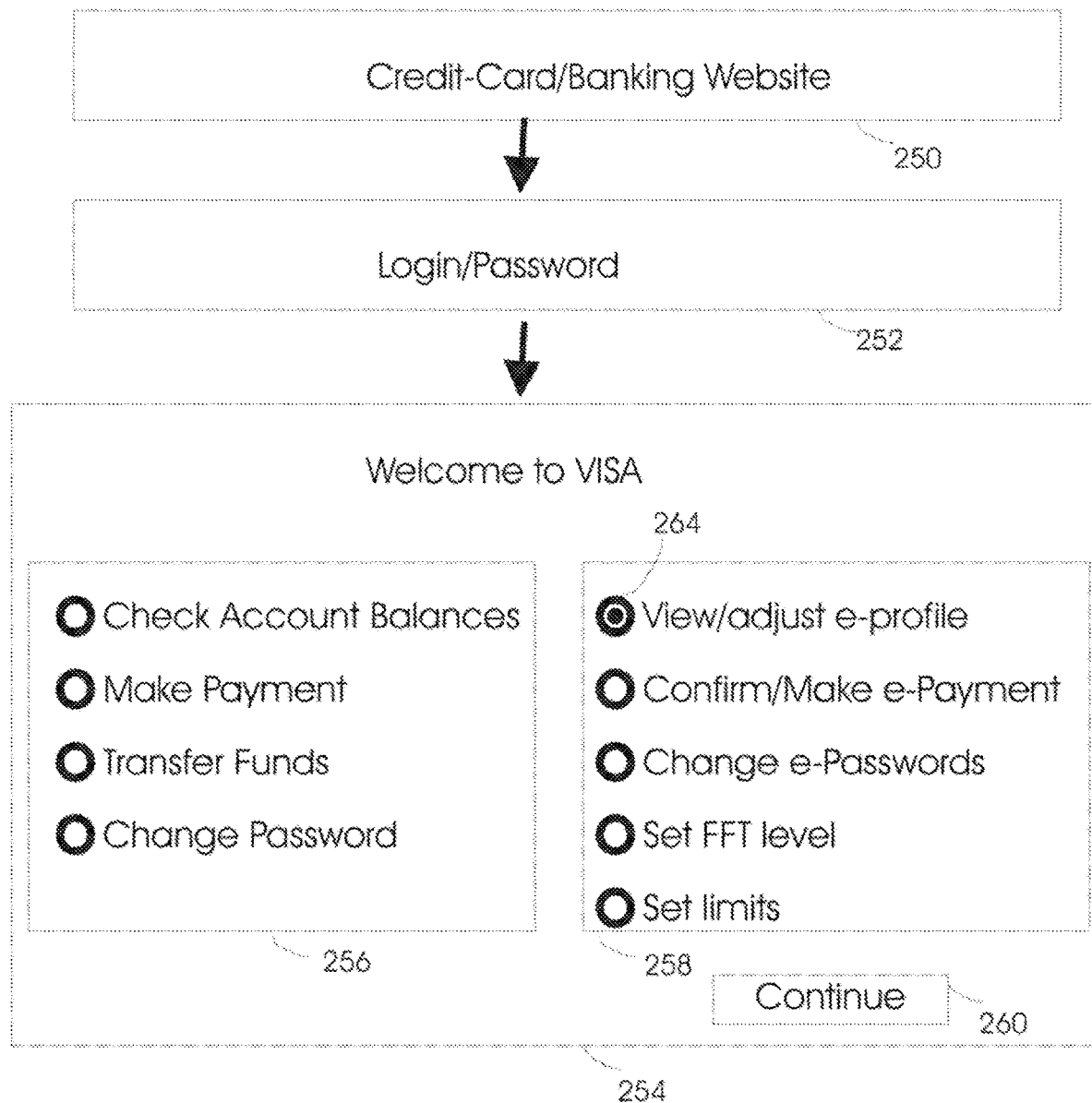
FIG. 9A. shows a method and web-based interface which can be used to modify a client's e-profile.

In step 116, if option 116*c* or "Internet-based FFP" is selected then step 122 occurs. Internet-based FFP may include methods that relay upon online processes, for example:

a. FFT-related server confirmations may be required for the transaction to be approved. One example of internet-based FFP is implemented so that the digital product that the client has purchased must communicate with the FFP-online server according to selected 'confirmation-rules'. For example, the client's computer may send a code identifying the digital product (a type of software or music file) and the client identification lumber, and the FFP-server would send back a code which would allow the digital product to run on the local machine as long as payment is in good standing. Alternatively, the client-side FFP manager software can send information about the digital product to the FFP-server. Further the client-side FFP program may be configured to check at periodic intervals with the FFP-server to obtain authorization for the product-client status. Only when the product-client status indicates that payment remains valid for the current usage period will the digital product be enabled to run as intended. This type of fraud deterrent option may offer a number of advantages to the seller/manufacturer of the software, but may be very inconvenient from the client's point of view since interact connections my not always be available and this strategy can slow down productivity, for example, when the FFP server is slow to respond or is experiencing unscheduled outages.

b. Online validation service-based transaction. This FFP deterrent option may be considered as another type of the internet-based FFP-deterrent and allows online validation and e-profile services to be used as part of the transaction. For instance a user may be required to log onto a secure validation website which provides a service validating and ensuring identities of its clients. The seller may also belong to this 'online community'. By providing the seller a confirmation from within the community the seller can be sure that the client is "trusted" and is a legitimate client. There are many variations and embodiments wherein e-profiles of a client can be validated, and established, in order to ensure the identity and integrity of a client. The online validation service may not only validate the client's identity (e.g. using a conceptual password) but can also indicate to the seller the security level or method by which the user was authenticated. The online validation service may also provide the seller with information which can be presented by the seller to a user and can then send confirmation to the seller that the user was successfully validated. A number of possible methods by which this can occur will be described further in the conceptual password section of this application.

c. In another embodiment, when the user purchases a good or service and the website sends an e-mail to the online verification site using an address supplied by the user. In order to complete the purchase the user must go to the online verification website, login using whatever validation process is required, and then respond to the e-mail. The validation website can then use this response to send the seller a confirmation of the user's identity by sending the seller the users validation information including name, etc. The seller's server must obtain this response prior to accepting the order. In a further embodiment, this verification can occur after the purchase and is more specifically related to the process whereby permission for the goods to be distributed to the client is obtained. As shown in FIG. 9A, this online verification site may be under control of the client's bank or may be a debit or credit card issuer or association.

In step 116, if option 116*d* or "Biometric FFP implementation" is selected then step 124 occurs utilizing various types of biometric authentication technology (BAT). This option allows Biometric information to be relied upon during the transaction. A biometric sensor such as fingerprint or other scanner, an optical sensor such as optical camera, or a microphone may be used to sense biometric data. Fingerprint validation and verification can occur, for example, using UPEK TouchStrip or TouchChip fingerprint, authentication solutions, and can include UPEK's "Pay-By-Touch" solutions including "Pay By Touch Wallet", "e-Check", and "age verification". Sonic biometric validation can include voice or speech recording, analysis and recognition. Biometric FFP deterrents may utilize sonic or ultrasound biometry, which can be used to measure characteristics of human tissue or organs. For example, eye-length (A-Scan or B-scan biometry), eye-scanning technologies including retinal scans (e.g. blood vessel pattern analysis via Daughman algorithms), and iris based methods can allow either identification (one-to many template matching) verification (one-to one template matching) of the client. Both steps 122 and 124 can include verifying, the identity of a client by having the FFT server communicate with 1 or more validation services which can provide an evaluation of data sent to it by a seller's server. Alternatively, the client and validation service can communicate directly, and the seller will simply receive confirmation and validation of the client's identity from the third party service, so that private information of the client is not relayed through a seller that the client may not trust.

In step 116, if option 116*e* or "Possession-based FFP transaction" is selected then step 128 occurs utilizing various possessions that only the client should have. For example, if a client has been associated with a radio-frequency identification (RFID) chip, which is known to either be implanted or otherwise held by the client, then during the e-transaction this chip may be read by an RFID reader which would be available on the client's computer. Alternatively, a passport, credit card, or identity card can be swiped in a "card" reader which can be connected to a client's computer. For further security, this may be done during a human-based multi-media session so that a customer service agent of the seller can watch the client and ensure that an actual card was swiped. This will deter software programs form being developed that would simulate the information being sent using a pre-recorded data-transmission scheme, rather than requiring the client to actually swipe a credit card. Another type of possession can be a CD or flash-based digital key which only the client should have (e.g., ImX Solutions Inc.'s products including CD technology and updated, time-limited tokens). Another type of possession can be physical cards which are used in screen-card solutions, discussed later.

In step 116, if option 116f or "Human-Based FFP transaction" is selected then step 130 occurs utilizing human interaction. This option allows audio, visual or multimedia technologies to be used during the transaction and to implement human interaction. For example, videoconference technology can allow the seller and client to interact similar to how they might during an in-store purchase. The client may read their credit card information to the seller and hold up their actual credit card to the video camera. Additionally, if a 'digital pen' or 'digital pad' technology is available then the client may be asked to sign for the purchase. The client can also be requested to perform an out-of-band (OOB) transaction using a client device such as a cell-phone or PDA.

Miscellaneous FFP Deterrent Options

Figure 4A:
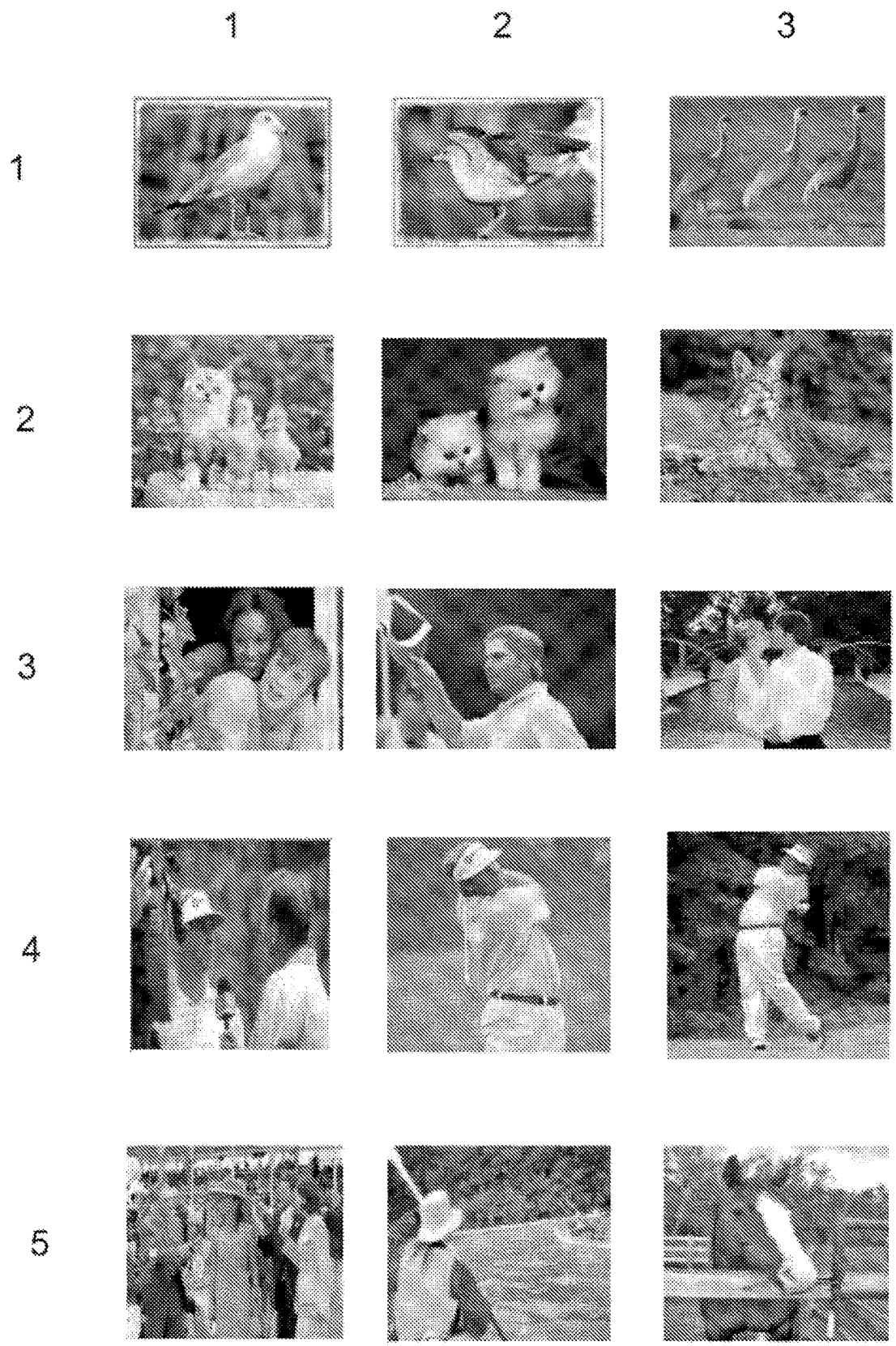
FIG. 4A illustrates an example of a conceptual password which is a picture set that enables a client to enter a picture solution set.

Step 116 can present the client with a number of additional FFT deterrent options that are not shown in FIG. 2 to avoid cluttering of the figure. A number of these will be reviewed here.

a. Voice-based FFP: Selection of a 'voice-based transaction' deterrent would cause voice-based transactions to occur. This may occur either as a subset of the biometric 124 or human-based 130 deterrents, or can be implemented within its own sub-category. A phone interview may serve as a validation during the selling transaction in which the client may be asked to verbally confirm information normally provided, over a web-based interface, and may also be asked additional information based upon characteristics of their response. Alternatively, the client may be required to call a 1-800 number from their home phone and this phone number may be matched against the contact information linked with the credit card. Additionally, a verbal transaction can be achieved using a voice over internet application, or service such as Skype. A full or sample recording of the voice-based transaction may be collected during the transaction in order to later serve as evidence that the client was genuine. In the biometric option a client may use a verbal password to validate identity. An issue here is that a verbal password can be recorded by a fraudster. Accordingly, in an FFT implementation that uses voice recognition the client may be asked to record between 5 and 20 words, any of which may be used for voice-matching. The FFT server would select the particular word needed either randomly or iteratively so that a fraudster could not simply record a user's voice and then replay that same word when subsequently asked for validation.

b. Out-of-hand OOB based FFT: In addition to using phones to provide out of band confirmation, users may be required to respond to an incoming text message by sending back a text message containing a password. User supplied passwords can be provided in response to an incoming call (where this is done via key-press or voice) or in response a text message. Failure to supply the correct password or to answer the phone may automatically cause the transaction to fail. Additionally using cellular triangulation methods, a users cellphone company can confirm in the positive or negative that a user is in the same location that a purchase is originating from (e.g. the cellular location assessed by the phone company must match the IP address location sent by the FFP server, more or less, in order for the transaction to be approved). This can be done in such a way as to keep the location of the client private, for example, the cellular company only confirms or not that the client's location matches that sent by the FFP server rather than sending the client's actual location back to the eFFT server so that the server itself can perform the match.

c. Browser Based FFT: In addition to starting the FFT operations at time of checkout (e.g. FIG. 1A) upon landing at a website (e.g. FIG. 1B), activation of FFT features can also be suggested at the start of browsing and as part of the web-browser platform, wherein users must validate their identities using FFT operations by interacting with the web-browser or a validation website to which the browser is directed. This type of pre-browsing validation may lead to an adjustment of the browser so that sellers know that the browser has been recently "verified". In one embodiment, the browser may include a plug-in module which presents a "validation" token to the seller's website showing that the user's identity has been recently validated (the validation token can be cross-validated by interaction between the seller and the service that provides the validation token) and which may expire within a specified period. In one embodiment the information of the token, can be sent by the seller to a third party which is a validation service that issued the token, in order to assure that it is legitimate (and to ensure the credit card being used matches the credit card that is registered to the user with the validation service). In another embodiment the information of the token, can be sent by the client to a third party which is a validation service that issued the token, which then contacts the seller's FFT server "browser validation" module 232 (of FIG. 8) and verifies that the user or transaction is legitimate. The browser-based FFT implementation can also allow the browser module to validate the legitimacy of transaction by ensuring that a particular visa, computer, shipping address and/or client is valid. The client can set parameters in an e-profile which determine how long a token-based browsing session can last, how long it can last before a reminder is sent to the browser that re-validation is needed, an also can regulate the type of transactions which are permitted via the browser. In addition to other types of validation methods which have been described, the use of a "validated" browser, obviates that need of having the user enter various types of validation information at time of purchase since the seller may assume that the client, is valid.

d. Concept-based passwords: Rather than, or in addition to, requiring a login and password both of which are traditionally alphanumeric, the FFP can rely upon a password that is defined by a concept known only to the user. A 'concept-based' or "conceptual" password is a valuable type of password technology because even if an onlooker is watching the client input a concept-based password, the rule which is dictating the client's behavior may be very difficult to work out. An example of a concept-based password is provided using FIG. 4A, which contains 5 rows and 3 columns of pictures. The 15 pictures which are shown represent a particular picture set. Unlike a traditional numeric keyboard, the each picture set that is used by the client can be selected or generated (in a random order) each time the client is required to perform identity validation.

The concept-based password utilizes at least one 'concept rule' which, in this example, requires a) that 3 items be selected by a client, and h) that all three pictures contain people who are not wearing hats. In this case the client should chose the picture located in the row 3, column 1 position (i.e. 'R3, C1'), and the pictures located at positions R3,C2; and, R3,C3. The pictures in position R4,C1 and R5,C1 fail to meet concept-rule because at least one person in each picture is wearing a hat. The pictures that should be chosen are the password items while the other pictures are distracter items (also known as 'hits' and 'misses', respectively). The following are other examples of 'concept rules' as well as the appropriate selections. The collection of hits can also be referred to as "solution sets". Concept Rule 1: Select 4 pictures in which people's knees are not shown. (Solution set=R3,C1; R3,C2; and R3,C3; Concept Rule 2: Select 4 pictures in which multiple subjects are all looking the same direction. (Solution set=R1, C3 R2,C1; R2,C2; R3,C1). Concept Rule 3: Select 4 pictures having at least 1 subject that is looking in the same direction as the subject of the picture in location R5,C3. (Solution set=R1,C1; R2,C2; R4,C2) Concept Rule 4: Select any 1 picture from the first row, 2 pictures from the second row, and the picture at position (R4, C3). (Solution set=R1, C1 or R1, C2 or R1,C3; R2,C1 and R2,C2 or R2, C2 and R2,C3 or R2,C1 and R2,C3; R4,C3). Concept Rule 5: Select 3 pictures in a column in which people are holding different objects and 1 picture from position R1,C3, (Solution set=R3,C2; R4,C2; R5,C2; R1,C3).

The concept rules can also be defined based upon geometrical patterns, colors, shapes, text items and other types of categories based that are based upon user preferences. A concept rule can comprise combination of multiple rules. For example, one rule might be to 'choose pictures with people looking the same direction' and this rule can be combined with another rule that states 'unless any person in the picture is wearing a yellow piece of clothing'. In other words, logical operations such as "AND", "OR", "NOT", etc can be implemented within context rules. Operations related to selecting picture sets, implementing concept-based rules, and verification of solution sets can be achieved using the 'conceptual password' module 234 of the FFT server 12.

The concept-based password has a number of advantages. Importantly, no special technology must be purchased or carried around by a client in order to enact this system. A large number of picture sets, concept rules, and corresponding solution sets can be generated relatively simply. A central advantage of this feature is that unlike a conventional password method, even if a fraudster installs software on a client's computer which records or relays what a valid, client is seeing on the computer screen and typing on the keyboard, the nature of the rule may remain unclear to the frauder. If a fraudster has collected this information from an unknowing client, this is therefore rendered relatively useless: upon trying to reestablish the client's identity the fraudster would be presented with a novel picture set when subsequently visiting the website. Accessing this type of information will no longer provide the fraudster with the ability to assume the true client's identity.

In one embodiment an FFT-participating entity provides pictures such as photos, drawings, paintings, words, names, designs, patterns, or other visual options of the picture set from which the client can select a 'picture password'. In an alternative embodiment, the client may provide a set of pictures which are well known and these can be used to define the picture set or a portion of the picture set. Similarly, the client may be asked to select the concept rules which will be used to define their picture passwords or these may be supplied by the FFT entity. For instance the client may provide (or select from a database) pictures only from the West side or East side of New York, which are presented with other pictures of New York. A bird-watching enthusiast may select pictures from certain families, or based upon geographical demographic. Similar picture sets and concept rules can be used to create picture passwords based upon personal knowledge related to sports history (e.g. teams to play in the SuperBowl between 1968 and 1978), pictures of particular types of architectural structures (e.g. bridges or buildings related to certain architects), statues or paintings of less popular artists, etc. The pictures may also contain animated clips such as movie clips, or can have other aspects which change over time. In this case the animation may have to follow certain rules for the associated pictures to be chosen as part of the password. For example, rules can state that "birds have to be shown flying during some portion of the clip", or "some objects have to be traveling across the screen rapidly and others slowly". The type of rules for this type of solution are almost limitless and the same animation scenes can be supplied as solutions for different concept-based rules. Since the chance of picking 4 of 15 pictures is much less likely if these choices must occur in a particular order, this can also be a feature which is required by the picture solution set. Imposing an order on the manner in which the pictures are chosen decreases the risk that a fraudster will randomly obtain access to a client's account. So for example, if there are 3 pictures of people, the pictures should be selected in the order of age of the people, with first the youngest, then the middle, and then the oldest. Alternatively, one could use hair-color, where the black haired people are chosen before brown haired people and lastly blond haired people are chosen.

Conceptual passwords can also include album covers, or photographs of famous people (singers), members of favorite bands, members of a particular band, or other conceptual manner of defining the subject content. Pictures can be combined with either textual or pictures of numbers, and the numbers for the password can all be linked by a certain relationship (for example, no numbers that contains the numeral '5' can be chosen, or must be chosen, depending upon the conceptual rule which has been used). Paintings of famous artists may be used, or paintings representing a particular period, or only pictures which, for example, contain the color purple may be used.

Figure 4B:
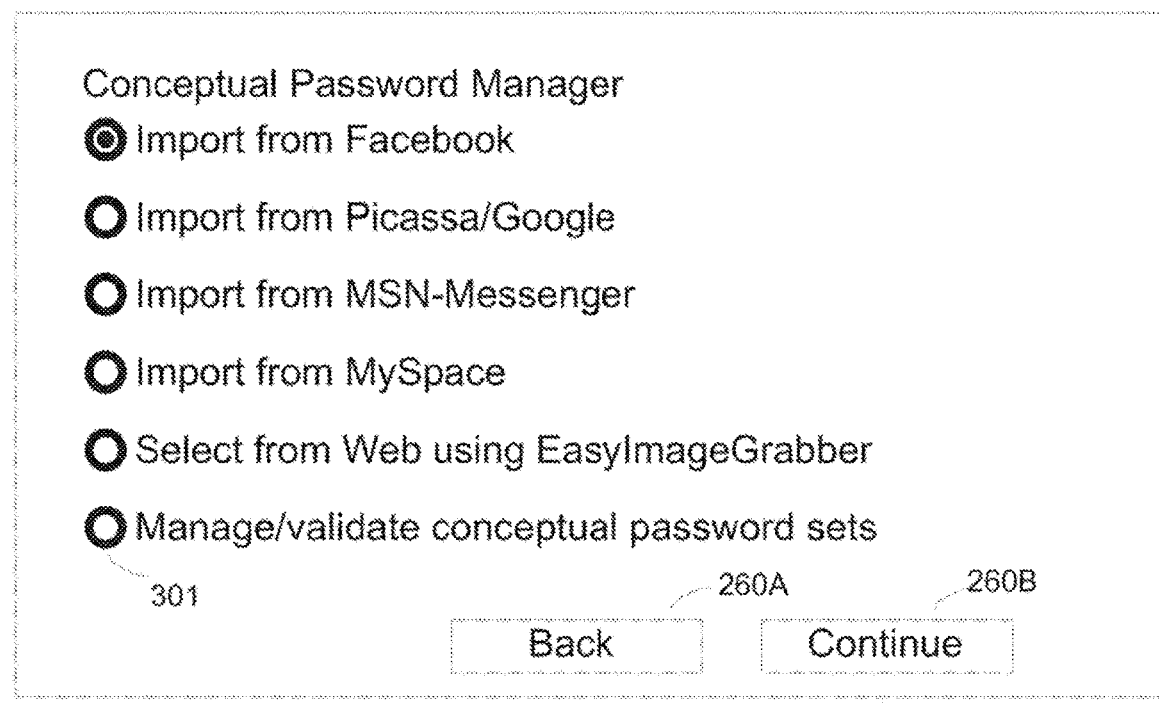
FIG. 4C shows a preferred embodiment of a screenshot of a software application known as EasyImageGrabber.

The conceptual password can be adjusted and even created by the client. FIG. 4B shows a preferred embodiment of a conceptual password manager screen 300 which is under control of the conceptual password module 234. The conceptual password manager screen 300 shown here enables the client to import images or videos from other websites and services. We see a number of import options 301 which include importing material from a social network site such as Facebook. In this case, Facebook can have an import utility that enables a client to select and import content from. Facebook such as pictures of friends, and pictures posted in image galleries. Importation can also occur from website entities which allow uploading and downloading of pictures and multimedia content such as Picassa/Google; MSN-Messenger; MySpace; Kodak.com; Shutterfly.com; and Youtube.com, using software modules written in order to cooperate with the infrastructures of that particular site. There are also options for managing conceptual password sets which have been uploaded by the user, which entail choosing 'hits' and 'misses' and organizing or selecting 1 or more password sets to be active. Controls such as buttons 260A, 260B allow the user to continue, go back to a prior screen, or exit the process.

Figure 4C:
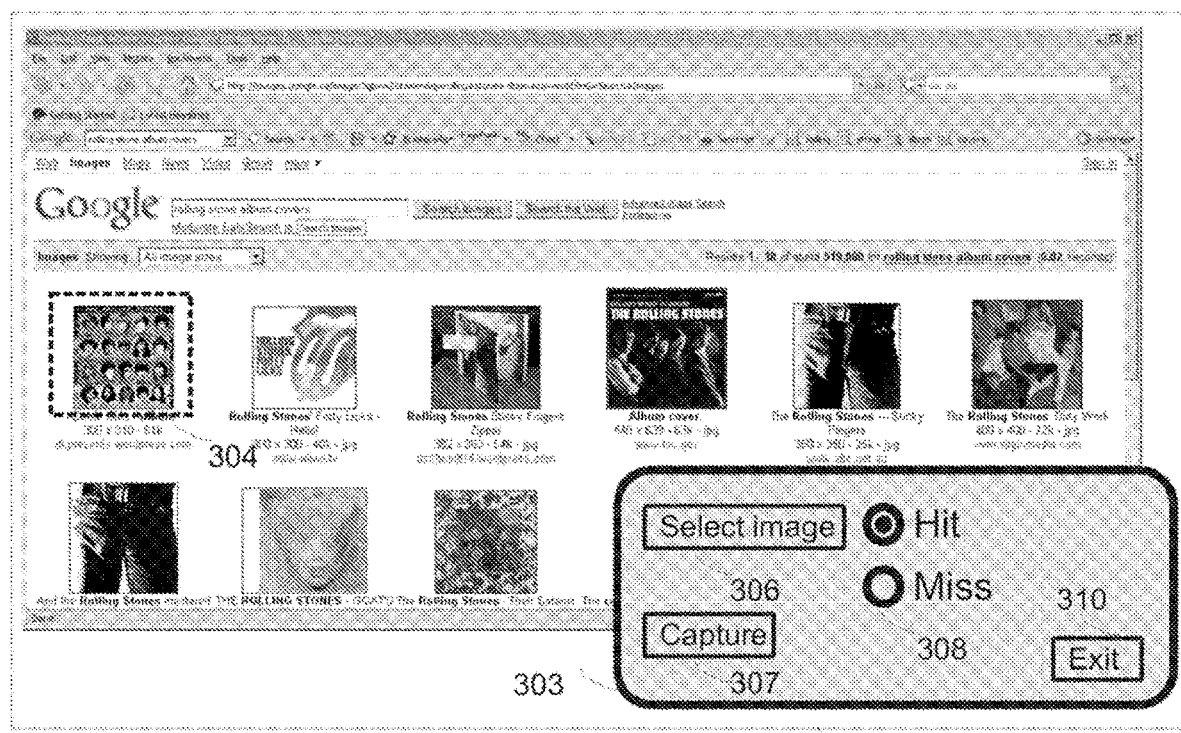

The conceptual password manager screen 300 contains an option for using a software application called EasyImageGrabber which can be run from within the conceptual password module 234. A screenshot of the EasyImageGrabber is shown in FIG. 4C. Here a portion of a user's desktop 302 is shown. The user has navigated to a website which shows album covers of the Rolling Stones, and a preferred embodiment illustrates the EasyImageGrabber window 303 which contains controls for obtaining images from the internet. A spatial selection box 304 can be positioned over the image desired by a client and can be resized to accommodate different sized images. The select image 306 control button is used to take a snapshot of what is within the spatial selection box 304. The image can be designated as a hit or miss using radio-controls 308. If a video sequence is desired then the client can press the capture button 307 to start video capture and then depress this button again after an interval of video has been captured. Alternatively, the duration of capture may be set to a standard duration of 4 or 6 seconds. After images/videos have been captured/imported by the client these may be defined as various picture sets (including hits and misses) using the manage/validate option of FIG. 4B. This option will invoke screens and operations which validate the conceptual password sets. Conceptual password validation can include a number of evaluation procedures which ensure the user selections meet specific conceptual password standards. For example, conceptual password standards may include: evaluating images used for hits and misses and ensuring that the two sets of images have similar characteristics with respect to color, sharpness, complexity; evaluating the images to ensure that these meet image standards or conceptual standards; human based standards wherein a human tries to guess a password set and if the concept is too easy then the password set is rejected. This is important, for example, if the hits are selected from one website and the misses are selected from a different website then differences in image quality may be enough to distinguish between hits and misses. If this occurs, then a graphical filter or other transformation process may be applied to the images in order to cause any differences between hits and misses to be within the variance of each set independently. In other words transformations can be applied to the images so that the within set variance is similar to the between set variance with respect to selected aspects of the images and/or video streams.

Multi-Factor FFT Deterrent Option Sets.

Rather than selecting any one particular FFP-option, different deterrent options can be combined resulting in multiple-factor authentication, which is known as 'strong authentication'. In one embodiment, FFT can require strong authentication which is defined as requiring two out of the following three proofs of identity; Something known by the client, like a password, an answer to a personal question, or even the client's height; Something possessed by the client, like an Credit-Card and computer identification number; and, Something unique about a person such as a biometric feature which can be measured, like a fingerprint.

These three examples may be thought of as three different types of identity classes (i.e. known, possessed, measured). Rather than two-factors, multiple factor authentication may be used where the number of factors $F_N$ are used, may be implemented where "n" is selected or increased based upon the strength of authentication which is needed. When the number of factors are increased it may be preferable to provide the client, with options selected from across, rather than within, the three types of identity classes (e.g. a BAT can be combined with a PIN code). Alternatively, as the number of factors are increased it may be preferable to provide the client with options selected from within, rather than within, the three types of identity classes (e.g. a the fingerprint for the index finger of the left hand can be combined with that of the right hand). Therefore, when client's are permitted to select 2 or more fraud deterrents, the client can be required to choose 1 method of fraud prevention from different identity classes. In the case of fraud deterrent option classes 116A-F, the client may be required to select 2 or more deterrents, where each deterrent must be selected from a unique class of deterrent option.

The various fraud deterrent features which have been disclosed offer a number of different advantages with respect to different fraudster types. For example, one type of fraudster is user whose intent is to obtain the item for free by requesting a chargeback and claiming that a credit card was stolen. The requirement of using a registered computer to provide the purchase will deter this type of claim. Another type of fraudster is a client who or disputes the payment of the transaction after the transaction has occurred by stating that they have not used the software product or are not happy with it. The FFT log of activity, the schedule validation and payment dates are configured to deter this type of fraudulent claim. Another type of fraudster is either a minor who uses a parent's credit cards without authorization or is an adult who will claim that this was the case. FFT features such as concept-based passwords will deter this type of fraudster as well as actual occurrences of unauthorized use. Another type of fraudster is a client who is using stolen credit cards, and the same or different computers over time, and the same or different ISPs. FFT features such as conceptual passwords, internet footprints, internal/external footprints, and the restriction of transactions to authorized computers will deter this type of fraudster. The different fraud deterrent options can be implemented in manners which are appropriate for the type of fraud which is being targeted.

The FFT features generally assist in deterring these different types of fraudsters and can be used separately or in combination. The FFT features can be used to collect information specific to the client to show that it was the client who actually made the purchase. For example, if a video-transaction was used during the purchase the archived video file could be used as evidence that the client made the purchase. This type of information can be used as evidence for the dispute process in this case if the client has attempted a chargeback action. Further, video-based transactions may require a preliminary step in which a customer service representative must confirm the client looks the same as an image of the client which is stored on the FFT-server. The introduction of an FFT client-side applications provides advantages such as monitoring the system processes, it can monitor the number of times a program has been activated and the length of time for which it was used and can send this information to the FFT-server during a validation session. This information can assist with refuting charge-backs using evidence showing that user has used a product subsequent to the billing period and has attempted a chargeback without contacting customer service or company for resolution. By obtaining information about the internet profile, such as computer ID, network location and ID, the FFT-server can collect evidence that a particular user is responsible for various types of fraudulent purchases, such as multiple purchases of the same or different types of software made from the same computer. If the FFT server determines that different cards are being used from the same computer or local network within a short period, then it can refuse the transaction or provide alerts to the seller.

The fraud deterrents and deterrent options can be automatically selected and adjusted during the e-transaction, according to the FFT-algorithms 216 implemented by the program being implemented by the FFT program module 222 that is operated on the FFT server computer 12. Further, all or some of the steps leading to selection and adjustment of the fraud deterrents that will be implemented may occur deterministically, in a pseudo-random manner, in a manner determined partially by the transaction profile, or primarily according to user, seller, or bank preference, as the case may be. While multiple deterrents with strong authentication can make fraud extremely difficult to accomplish, the simple features such as installing FFT-client side program are also very effective, especially with respect to deterring a particular fraudster from repeatedly committing fraud. For example, when the client-side FFT-program is run, it can send back client profile information such as computer ID number, computer name, and IP address. If the fraudster then subsequently performs fraud, this is associated with that information so that the next time that the same fraudster downloads the FFT-client side program, it can match the computer's identification information to the previous transaction, which is now on the Fraudster list, and can identify the fraudster. In order to repeat fraud, the fraudster would have to keep changing computers or devices from which the transactions are conducted, credit card numbers, and even LAN's, since the LAN when the LAN is identified by the client-side FFT program. This drastically changes the digital landscape in which a fraudster is forced to exist.

Additional features, such as scheduled payments and validations, which are trivially accomplished by a mouse-click or two for legitimate users require much more energy and thought for the fraudster. Since the client-side FFT program may be programmed to require validation of the payment at 30 and 60 days, failure to validate may indicate to the FFT-server side program that the fraudster has disabled or removed the FFT-client side program. If this is the case then the FFT-email program can be programmed to send an e-mail, chargeback claims will be more difficult to substantiate, and repeated attempts by the same fraudster will be much more difficult. Rather, similar to the practice which occurs when making a hotel reservation, although the purchase price is "held" against the card, the card may not be actually debited the full amount until a scheduled payment date which may be 5 to 10 days after the purchase is made and may only occur after validation and verification of user satisfaction. This feature makes later rejection of the charge by a client more difficult, and decreases the financial risks of a seller who is a distributor rather than a manufacturer (and who is liable to the manufacturer for the sale) or a card-issuing bank. As such, while deterring the purchase or acquisition of software and digital media by a fraudster is a primary feature of the invention, identifying a potential fraudster and differentially processing the transaction or even prohibiting or aborting the e-commerce transaction is also intended.

Selection of FFT Deterrent Option Sets.

An FFP is a type of FFT wherein a purchase is made. Other types of FFT's relate to, for example, accessing a restricted area of a website, logging into an internet website, accessing a software product that is utilized in an online fashion (e.g. using a word processing program, and/or associated file, implemented on a remote server). If the transaction type is a purchase, then a confirmation of shipping address may be part of the FFT process, wherein, logging into an internet website to use a remote application or service would likely not require this information.

The menu items presented in step 108 (of FIG. 2 and FIG. 5) can be selectively restricted based upon the transaction profile including the transaction type.

Figure 5:
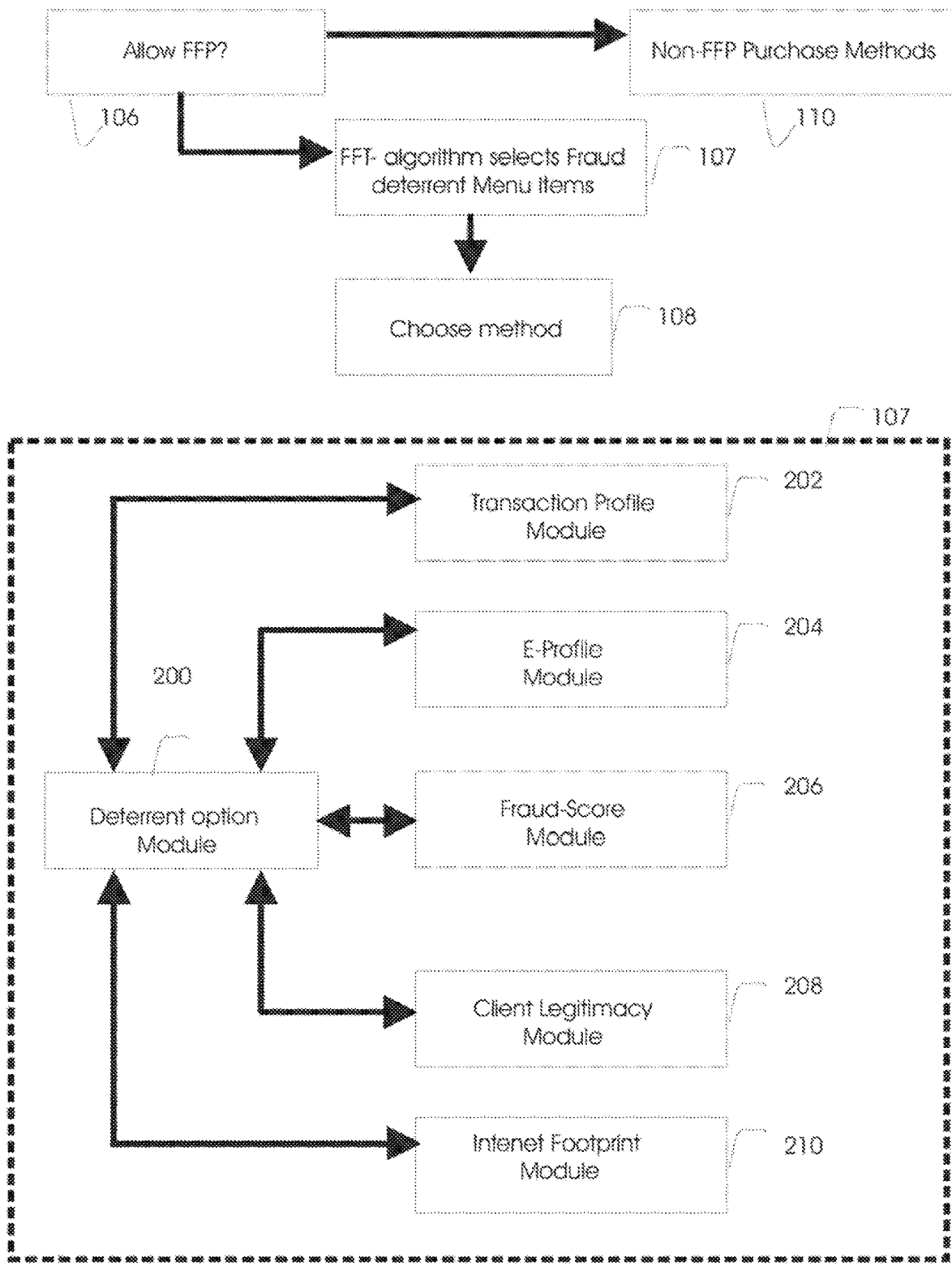
FIG. 5 illustrates a schematic representation of a method of modifying an electronic transaction by selecting fraud deterrents according to an FFT-algorithm.

FIG. 5 illustrates one embodiment wherein one or more fraud deterrents are automatically selected by the FFT-server computer 12 which is running the FFT-server software 200-236 to achieve FFT operations 107. The set of deterrents can be selected according to an algorithm of the deterrent option module 200 of FIG. 8. The algorithm of the module 200 may be configured to randomly select the deterrent options which are used by, or offered to, the client. Alternatively, the algorithm of the module 200 can select the fraud deterrents based at least in part upon the 'transaction profile' that is calculated by the transaction profile module 204.

A transaction profile is comprised of at least one of: a banks preferences if the bank is hosting an FFT service; the sellers preferences (e.g., a seller's deterrent preference with respect to a particular product); the manufacturer's preferences (e.g., a manufacture's deterrent preference); the item profile (e.g. is this a software product or an update for a software, product?What is the value of the item?) and the user's e-profile (e.g., a user's recent web activity, and any aspect of a referring website by which the user arrived at the seller's website, a credit card number being used for the transaction). Rather than the seller's preferences, the preferences of a bank or third party FFT service can be used if the user validation is performed by the bank or third party FFT service, respectively.

The algorithm of module 200 can select the fraud deterrents based at least in part upon e-profiles. E-profiles are set, calculated, accessed, and/or verified (either locally or remotely, if these reside remotely) using the e-profile module 204, and can be either client provided E-profiles (CPE-profiles) in which the client has participated in the generation of information related to their e-profile or client derived E-profiles (CDE-profiles) which are calculated without the client's active participation. The term 'e-profile' can refer completely or primarily to either of these, or to both of those.

A client's e-profile can include, for example, an IP address; a real world address; an e-mail address; a shipping address; a billing address; a credit card number; a credit card history; a payment history; a purchase history; history of timely license renewal; a product serial number associated with the user; a computer identification number; an operating system identification number; a pattern of recent activity related to the client; a pattern of prior activity of the client; a phone number; an online e-profile (i.e. CPE-profile); a profile cm a verification or profile website; a profile cm a different commerce-based website (e.g. e-bay/pay-pal); a profile on a validation website; a profile on a social-network website (e.g. Facebook, MSN Messenger); a profile on a bank's website; a profile on a referring website; and, a client's name or other real-world type of information. The client's e-profile can also pertain to whether the user is using a promotional code or voucher. In some cases, if the promotional code was e-mailed to the user by the seller, the code can be used to identify the user and to verity that the user is also the owner of a credit card which is being used. Aspects of the client e-profile can include information (e.g., purchase history of the client) contained in historical tables of FFT-client side software modules that may have operated on the client's computer.

The algorithm of deterrent option module 200 can select the fraud deterrents with fraud deterrent strengths based at least in part upon fraud deterrent scores, A 'fraud deterrent strength' (FDS) parameter value can be calculated by the 'fraud score module' 206 of the FFT-server software during the transaction. The FRS value can be adjusted according to the characteristics of the transaction profile such as the value of an item, whether it contains a licensing manager module of the manufacturer, geographical location of the client, and aspects of the client profile such as the purchase history of the client. As the FDS value is increased, the set of fraud deterrent options which are proposed to the user may be made more rigorous (e.g., requiring an additional verification factor to simply using the 3-digit SVV code or 'card security code' located on the back of a credit card) and/or may also increase in number. The FDS may be increased as the amount of fraudulent activity, or related indices, increase in relation to the FFT server, or as assessed by third parties with which the FFT server communicates, although this may not be specific to the specific client. For example, if the number of purchases, charge-backs or rejected orders is increasing above a selected amount during the current time-period then the FDS value may be raised.

The algorithm of the module 200 can select the fraud deterrents based at least in part upon a client legitimacy module 208. The client legitimacy module can evaluate the electronic profile of a client to determine the risk that the client is taking measures related to fraud. For example, the client legitimacy module 208 can attempt to determine if the client is communicating directly with the seller's server or is relaying their information through a virtual address on a remote server. In other words, a client in one location may be taking measures to appear as if they are located in a different location, for example via a proxy server, and the legitimacy module is configured to identify this type of occurrence.

The deterrent option module can use the information provided by these other modules to select and adjust the fraud deterrents which are either selected or presented to the client as options. These options may be presented graphically in the web interface window, for example as one or more check-boxes or otherwise, as part of the checkout process, for example, a by modifying the components of electronic shopping cart. These options permit 'fraud free purchase transactions' to occur, which are an e-transaction in which at least one of the described fraud deterrent is accepted by the user, and is implemented with the assistance of an FFT-server which is configured to run a server side FFT-software program that performs the required operations and interacts with a client side FFT client-side application if it is installed on a client's device.

Client Rejection of FFT

In some instances the client may be allowed to reject some or all of the proposed fraud deterrent measures. In FIG. 2, this leads to client-based FFT-rejection operations of step 110 which can be achieved by client reject FFT module 210 of FIG. 8. Step 110 may entail a number of consequences such as flagging the transaction as potentially fraudulent, increasing the FDS in the fraud score module 206 and invoking more stringent algorithms of fraud detection or deterrence implemented by the FFT server 12 during the remainder of the e-commerce transaction (e.g. the amount of information on a checkout questionnaire may be increased by the client questionnaire module 224). Step 110 may also invoke additional repercussions such as setting modifying parameters in the 'delay/schedule operations' module 226, to provide, for example, a delay between the client's payment and the client's ability to download a digital product, or the shipping date of a product, as the case may be. The client may be notified of such implications. For example, step 110 may include causing FFT-reject module 210 to present a message to the client such as "If you do not participate the software will require an activation code to be entered 3 days after the software is installed".

Merely presenting an option to allow the FFT methods can assist in increasing fraud detection even if a user rejects one or even all FFT deterrent options. For example, the simple rejection of all of the proposed FFT options, may signal an increased likelihood that the client is a fraudster. Further, rejection of FFT operations may cause the FFT-server to perform a number of operations which can decrease fraud. If the user does not opt to participate in a fraud free transactions then selected "non-participation" operations may be implemented by the client reject FFT module 210. The client can be informed as to the nature of these non-participation operations (e.g. product delivery will be delayed by several days) or non-participation consequences can occur in manners that are not known to the client (e.g., increased questionnaire items may be generated at time of check-out). Some examples of non-participation consequences implemented in step 110 are: a. the user may be warned that failure to allow at least one FFT deterrent will result in a delay in delivery of the e-product; b. the user may be informed that the software which will be made available will be demo software that has certain limitations; c. the user may be informed that the software which will be made available will stop running after a specified period or number of uses (e.g., until after a subsequently scheduled validation of payment); d. a customer service agent may be assigned to the transaction to more thoroughly examine the data which the client enters, including the rate at which the data is entered. A real client should be able to enter billing information faster than a fraudster who may have to "look up" this information since, it is not memorized; e. the rejection of FFT transaction can set an increased fraud score and also the strength of the deterrent which is required of the user since this rejection may be indicative of increased likelihood that the client is a fraudster; and, f. the rejection of the FFT may result in the seller subsequently providing the client with a "web service not available" message, or other message which indicates that the transaction is not possible at the current time. In other words, the rejection of FFT can enable the seller to determine that the client is a customer that it would rather not sell to, at least for the current item and current time period. This option may be implemented under the guidance of a human operator.

This last consequence of the FFT rejection is related to the psychological aspect of the "rejection" decision. If the client rejects all FFT options, this may be indicative of an increased likelihood of fraud intention. Thus, although the proposed FFT deterrents may not be implemented directly, these may provide benefit by detecting potential fraudsters and either rejecting, evaluating or otherwise differentially handling the transaction. The historical record of rejection of the FFT deterrents, as well as the level of FFT deterrents which are accepted by a client, is information which can be stored as part of the client's profile. Rejection, or repeated rejection, of the FFT deterrents may, in some instances, result in the automatic registration of the client (or a particular credit card number, IP address, or other transaction information) on a list of potential 'fraudster entities' which is kept on the FFT-server, A 'fraudster entity' may be a user, a card number, IP-address, product identification number, or any other type of identification that is linked to a potentially fraudulent transaction. Lastly, because a fraudster may not understand the FFT system and operations, as well as methods that may be developed to circumvent these, the enthusiasm for pursuit of the fraudulent purchase may be diminished when the fraudster encounters an entity hosting or relying upon the FFT service.

Software-Based FFT Deterrents

One of the fraud prevention deterrents that can be implemented during an e-transaction is an FFT-based software program. This was shown as the first deterrent type 116a of FIG. 2. In a preferred embodiment, the FFT software can be installed, at least temporarily, as a client-side FFT software application on the client's computer as part of the electronic transaction. The client-side FFT software may perform a number of client-side FFT operations such as collecting information related to the client's e-profile such as a computer name, identification numbers of hardware components or serial number of the installed operating system, and information related to how the client has connected to the Internet or LAN. After obtaining this information, the FFT-based software may then store this in a data file and/or send this information back to a remote FFT-server for storage.

Once installed, the FFT software can perform a number of operations.

a. It can operate to maintain a historical record of e-transactions between the client and one or more different companies that participate in the FFT program. The historical record can also be maintained on remote FFT server. The remote server can reside with a 3rd party (such as the client's bank), and can be contacted during sales transactions initiated by any number of sellers, rather than requiring each seller to have an FFT server.

b. The FFT-client software module can be adjusted to contact the FFT-server at a specific date, after a software product has been used a number of times or for a specified duration, periodically or in another manner. In one embodiment, early after the e-transaction, the FFT-software can send the FFT server information about customer usage of the product in order to assist the seller with any chargeback claim subsequently made by the client. In another embodiment, the FFT-software can be configured to verify that payment was made (i.e. the purchase was valid) and to carry out specified operations if the FFT-server indicates that a chargeback occurred.

c. The FFT-client software can contain information about when and how to de-install itself after payment validation has been made. Even if the FFT-client software is un-installed, either automatically or by the client, relevant data which was collected when the FFT-software was installed, or first run, on the client's computer would have already been sent to the FFT-server. During subsequent purchases, if the FFT software is re-installed then the information can be cross-matched with information of the FFT-server and may be linked to client e-profiles which reside on the FFT-server.

The FFT client-side software can be installed as a stand-alone program which may be a memory resident program which is loaded at startup or may be invoked by a client when purchases are going to be made. The FFT client-side software can also be implemented as modules within other programs such as antivirus programs, operating system update modules, or other programs that more or less continuously are able to establish communication with the internet such as a messenger program which is a social media-based program (e.g., MSN-messenger). The FFT-client side program may also be incorporated into a web-toolbar, a Java-applet, or the like. Further, rather than residing on the client's computer the client-side FFT program can be realized partially, or fully, using a third party service that the client log's onto during the transaction. For example, the client may log into their MSN account prior to performing an e-transaction, and the FFT features such as a conceptual password may be presented to the client via this third party service. In addition client side-software being realized upon a client's computer, the software can be loaded onto any computer device such as an iPhone, Blackberry, or other personal communication device and may also be realized partially or fully using specialized hardware which performs functions described herein as software functions and modules. The client-side features can also be linked to hardware unique-identification solutions such as RFID chips, CPU's with unique identification numbers, anti-theft device tags, Non-Volatile Random Access Memory NVRAM and static BIOS identification information, and the like.

Parameter Tables: Examples from the Server-Side and Client Side.

When the client, seller, or bank choose or impose fraud deterrent options that involve installation of and communication with a client side FFT software module, this module may be installed on the client's computer, or, if already installed the residing FFT software module may be queried by the FFT-server. In FIG. 3A the data of Table 1 contains information that may be contained in the client-side FFT program such as transaction/e-profile module 402, of FIG. 10A or FFT server-side transaction profile module 202, of FIG. 8. For example, client profile information including a history of purchases of the client may be constructed within the client-side FFT-module 402 or FFT server-side transaction profile module 202. The historical information can include a product ID, Last 4 digits of a credit-card that was used for payment, source of payment (e.g. credit card, pay-pal), confirmation number used in the sale, license expiration information, version information, computer and operating system identification and version information, any status information related to chargebacks, seller identification numbers related to transactions, manufacturers identification information, and other types of information as well. The historical information can be fully available, partially available, password protected, encrypted, made available continently based upon FFT rules and protocols.

In the example of Table 1, of FIG. 3A, the first column contains information about the product that was purchased, the second column is the price of the purchase, the third is purchase date, the forth is a unique seller ID which corresponds different online sellers or commercial entities. The fifth column contains client identification information, and may include an identification number which has been assigned to the client, information about the computer being used by the client (e.g. a unique identification number such as a hard-drive serial number or computer identifying number). The sixth column relates to the payment and verification history. In this case "complete" means the transaction occurred and subsequent FFT operations determined that payment was completed for the product. In the second row of column 6, the values [30, 60] and the word "complete" indicate that FFT verification occurred twice after purchase at 30 and 60 days and that the payment was successfully made. If rather than the term "complete" the term "failed" was present, this would indicate a problem in the FFT verification and additional information may indicate the nature of the problem. For example, failure to communicate with distal FFT server, subsequent rejection, chargeback, or removal of payment may be indicated. The last row indicates that an FFT verification procedure slated to occur in 45 days for the thud item logged by the FFT module.

As shown in Table 2, of FIG. 3A a transaction profile can be comprised of an e-profile for the client, an internet profile, a manufacture profile, a seller's profile, a bank-customer's profile, an item profile, or any a combination thereof. Authentication strength or fraud deterrent scores can be adjusted based upon the nature of the transaction as reflected in the transaction profile.

Generation of the client's e-profile can be obtained by getting this information from: an FFT-server, from a client-side FFT program; from information supplied by a client on a web-based form; maintained in an e-wallet type of device; information gathered from the internet profile; as well as other sources. A client profile can include generation of a payment profile. Payment profile generation can include review of a chargeback database, history of fraud scores associated with a client, a network wide velocity check which relates to the number and speed at which the credit card information supplied by the client has been used for prior purchases, bank identification number (BIN) to country matching and a high risk BIN check, address verification service matching, the number of prior times the payment information has been used, rejected, or used with other shipping information. Payment profile operations can also check the number and type of items being ordered against prior orders, such that institutions are permitted to purchase multiple copies or licenses of a given product while when non-institutional entities attempt this type of purchase the fraud score may be increased. Payment profile can also assess, network patterns amongst participating sellers or within the network of a particular seller, and merchant pattern matching related to transaction profiling, merchant profiling, merchant activity profiling, syndicate information, and chargeback database information, related to a particular merchant or product. For example, if any aspect of a user's profile was recently related to fraud within any merchant included on the FFT-network, then if similar information shows up during a transaction with a different merchant, the fraudster can be quickly detected and deterred. Payment information can also include checks to see if the credit card number is being used in a country that is different than the bank that issued the card, if the credit card is being used for a dollar amount which is considerably above the prior transactions of a client's purchase history, if the shipping address is a P.O. box in a location where this might not be likely, and other idiosyncrasies related to the payment or shipping information.

Generation of an internet; profile can include, for example:

a. Reverse DNS validation techniques such as IP conversions to: country, zip code, NPA/NXX, or billing address.

b. Checks for high risk IP address, open proxy check, open proxy check and additional IP-address-related checks and cross checks. Internet profile generation can include real-time e-mail validation, including address validation and cross-checking with known spammer or high-risk e-mail database.

c. Evaluation of client's recent activity within the seller's website or within a referring website, prior activity by that client on the sellers website. Recent activity can also related to fraud on the seller's website which may not be directly related to the user but may represent increased fraud during a recent period which may for example, be over the previous 2 hours, number of recent visits and time spent on different pages, as well as information related to "snapshots".

d. Snapshot information related to the information provided by a user on a webpage at different moments in time. For example, if a client fills out fields of a form differently at two different times then the snapshots would be different (changing the amount of payment or credit card number).

e. Times and durations of page views and filling out of forms on web-pages of a seller, rate of change of information within the same order. For example, if a user spends a lot of time filling out billing information, repeatedly changes aspects of the billing information, or otherwise handles the same web-form differently at different moments in time then this may be an indication of fraud.

A manufacturer profile can include, for example: preferences for fraud deterrents which are used, which may be adjusted as a function of prices of products; values related to counts, rates, trends, and statistics of fraud occurrence calculated over at least one period which may be a recent period; geographical regions of users for which certain products should be offered, adjusted, or restricted, and other parameters as well. For example, certain types of demonstration software may not be offered or may be more restricted based upon the client's e-profile, according to the manufacture's preferences. In the example shown in Table 2 of FIG. 3A, the manufacturer profile has simply been defined so that if the item sold by the manufacturer is over $500, then the FFT server should examine the phone number which is provided by the client and, if possible (i.e. this is a preference, not a requirement, as indicated by the value of '1' for that parameter), should alert a customer service agent who can process the order by phone. The seller and item profiles can contain parameters and parameter values which adjust the types of fraud deterrents which are suggested or implemented, as well as other aspects of the e-transaction, as dictated by the FFT program 222 of the FFT server-side program 12.

The transaction profile managed by the transaction profile modules 202/402, including the client profile and payment profile, can be accomplished in real-time or near real time, and can occur transparently to a user, as a background process of the shopping cart or FFT client-side program, or in an overt fashion. All of the information of the transaction profile can be checked, and cross-checked to determine, for example, the number of times an e-mail address has been submitted with a rejected order, the number of times a shipping or billing address has been submitted with a different user's name or credit card, how many times a particular piece of information has been submitted for a rejected order historically. If a client-side FFT software application has been implemented upon a client's computer, then information it relays to the FFT-server (e.g. computer ID number, operating system identification code, software and license codes, purchase history) can be stored in the transaction profile 202/402. Since the transaction profile is dynamic it can change over time in response to client input, and information provided by, and in response to, fraud deterrent options proposed to the client. Through cross-checking, transaction profiles can also include historical identities assumed by the client as evidenced by records of logon names and passwords.

In addition to fraud-score values being positive, assessment of transaction information may include items which serve to decrease the fraud score by being negative. For example, if a user seems to be a returning client who is using the same credit-card and shipping address then a very large negative fraud value can be generated by FFT algorithm modules 216/416 or a flag can be set which indicates very low for even none of the fraud deterrent measure will be used during the transaction. Although generation of fraud values or calculation of a fraud score may be shown in the FIGs at discrete steps, fraud deterrent operations may occur in the background as the transaction proceeds and can occur repeatedly, or in sequential and parallel manners with other operations.

FIG. 3B shows a Table 3 which illustrates an example of a portion of parameter values that can be set in order to adjust the operation of the FFT-server program 222. Each column represents an operating condition under which the program may run. Generally, the default operating condition is evaluated as true which causes the client profile to be assessed. If none of the other columns are assessed as true then the default parameters are used. If any of the other columns are assessed as true then the column with the highest fraud deterrent score (FDS) is assessed as true and is implemented. In the case of a tie, the algorithm can be defined to choose one column of parameter values over another. In a default case, two deterrents are proposed to the user and the user must select one of these. If the product is identified as Product 1, then two deterrents are selected and the user is not given a choice about permitting these to occur. If the product is identified as Product 2 then three deterrents will be proposed to the user and the user must choose 2 of these. If Condition 1 is evaluated as true, for example, a client profile indicates something suspicious about the client, then 2 deterrents are randomly selected from the possible 5 that ate 'included' and user must select 2 of these. If Condition 2 is evaluated as 'true' then the user can only complete the transaction via human interaction.

Four components of the transaction profile are shown including the client, seller, item, and manufacturer profile (card-issuing bank profile can also be used). When the parameter values for these profiles are set to 0 then the values associated with this profile may be ignored while a value of 1 causes these profiles to be considered in determining the FFT-related operations and calculations which will occur. The 'fraud deterrent strength; parameter value may be set within a range such as from 0 to 5, where 0 indicates that no deterrents will be selected, and 5 indicates that those deterrents with the highest strengths will be used. The 'random selection' parameter value can be set, where 0 and 1 turn random selection "on" and "off", respectively. The 'propose to user' parameter value can be set to 0 if the deterrents will simply be implemented and to 1 if these deterrents will be presented or proposed to the user as proposed options which can be accepted or rejected by the user, where values of 2 or more will indicate that 2 or more fraud deterrents are proposed to the user. The 'number of deterrents' parameter value can determine the number of deterrents that must be selected by the user. Four illustrative types of possible fraud deterrents are shown and parameters values for these deterrents can be set as 0 or 1 in order to determine if these are included or excluded from the deterrent set which is selected for or proposed to the client.

Electronic Footprint Validation

Electronic footprints can be generated about the client by the FFT server-side application module 212 using a number of sophisticated techniques. A number of internet services have evolved to deter internet based fraudulent activity (e.g., www.sellitsafe.com; and www.netscantools.com) by assessing the internet profile of a user. Validation techniques can involve ping sweep techniques, who is query tools, DNS Verification (e.g. the server can obtain an IP address of a client, perform a reverse lookup to obtain a hostname and then translate the hostname back to an IP address in order to determine if these match and thereby verify the DNS record).

The installation of an FFT client-side application, as per the present invention, allows the footprint module 406 to accomplish internal generation of an electronic footprint of the client (known as an 'internal footprint'). 'Footprint-based' FFT method can include generation of a transaction's internet profile which may include network footprints which are external network footprints, internal network footprints, or both. The generation of a network footprint can include DNS validation and testing and include operations which are commonly used to identify networks. For example, the network footprint can include using a name-server lookup module which has functions for querying DNS servers resolving IPv4 addresses or hostname. Network footprints can also include implementing modules for determination of NetBIOS computer names, IP address queries. TCP/IP values, network subsystem names and zones, alias names, network and internet relay settings, lists of default name servers. The network footprints may obtain this information using functions such as UNIX commands using the various parameters specified to define which records are requested from the network (e.g. performing NSLOOKUP, AXFR, and DIG queries and record types including A, ANY, CNAME, MX, NS, PTR, SOA, and TNT). The network footprint program can also verify and audit IP address/hostname mappings, and determine IRR/AS routing information for IP addresses. Network validation may include time-validation routines such as sending pings and recording time taken to resolve pings in order to determine if processing is occurring locally or being relayed outside of the local network server. The ability to query the network in order to find other computers on that network can assist in detecting subsequent attempts to communicate from that network, even if the user has changed the name of their computer or switched to a nearby computer.

Using both the client-side FFT program footprint module 406 to generate an internal network footprint and a server-side FFT program footprint module 206 to generate the external network footprint allows comparisons to be made between the information of these two footprints. Mismatches for particular fields may indicate the user of virtual identities via re-routing methods which may be used, for example, to make a user appear as if they are located in a different country from that in which they are actually located if they are communicating via proxy servers. The FFT client-side program can generate a computer profile which is part of the internet profile for the client by querying the system registry for identification information including serial numbers of installed devices of the computer as well as network printers and devices. The FFT-program may request permission from the diem before assessing or sending any or all parts of an internally generated network footprint.

FFT Communication Paradigms and Protocols

Figure 6:
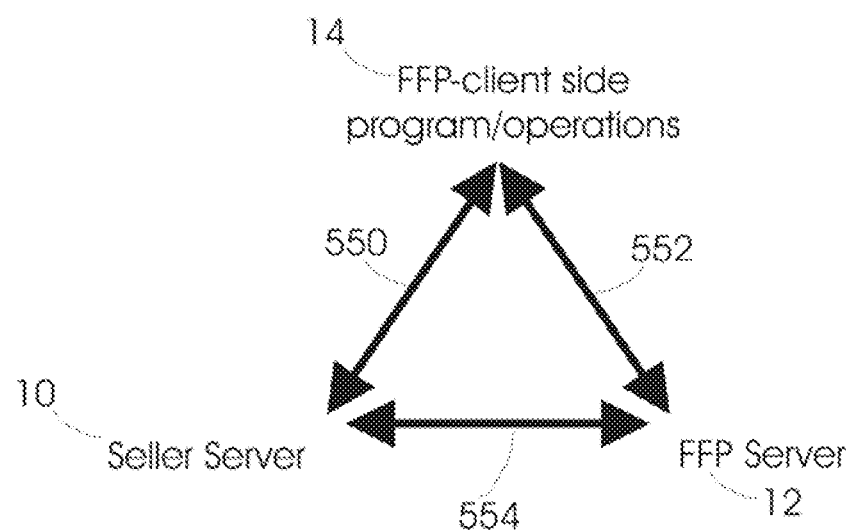
FIG. 6. illustrates communication paths for operations that may occur during the FFP-based transaction with respect to the client's computer, an FFT-server, and a seller's server.

FIG. 6 illustrates communication operations that may occur during the FFT-based transaction with respect to the seller's server computer 10, the FFT-server computer 12, and the client-side FFT-program or operations which are implemented on the client's device 14. Although the FFT-server 12 may be implemented as part of the seller's server 10, this is not necessary and the FFT-server may be a physically distinct server either operated by the seller or can be operated by a third party such as a bank. When the FFT-server is operated by a third party, then information shared between the client-FFT 14 and the FFT-server 12 will not necessarily be made available to the seller's server 10. This has certain advantages, for example, the seller is not privy to confidential information of the client, such as passwords or biometric data, which is validated by a validation service running an FFT-server 12. When a client is validated successfully then the party running the FFT-server 12 sends confirmation (and a confirmation transaction code) of a successful validation to the seller's server 10, while failure to validate leads to a failure notice being sent to the seller's server 10. While clients may not wish to send data related to their fingerprints to a relatively unknown seller, popular validation websites which are trusted by clients can enhance client security and compliance with undergoing validation procedures. The third party that operates the FFT-server 12 can keep records of the transaction and assist the seller in resolving disputes related to billing, as indexed by the confirmation transaction code for a transaction. For the client, the communication between the seller and the third party FFT server 12 may be invisible and may occur as a background process. Alternatively, a pop-up window or frame of a web browser may be created wherein the client is made aware that their information is being exchanged with the third party, rather than the seller.

When a third party FFT server 12 is used for validation it may provide different types of information to the servers 10 of different sellers. For example, if the seller's server 10 is trusted by the third party's FFT-server 12 then it may give the information (which may be in percentage of total, in number of occurrences, or a normalized fraud value for that item) shown in column 2 of Table 4, whereas an unknown seller may only obtain the information in column number 1. These distinctions are shown in the example of Table 4.

Illustrative Embodiments FFT-Methods

Figure 7A:
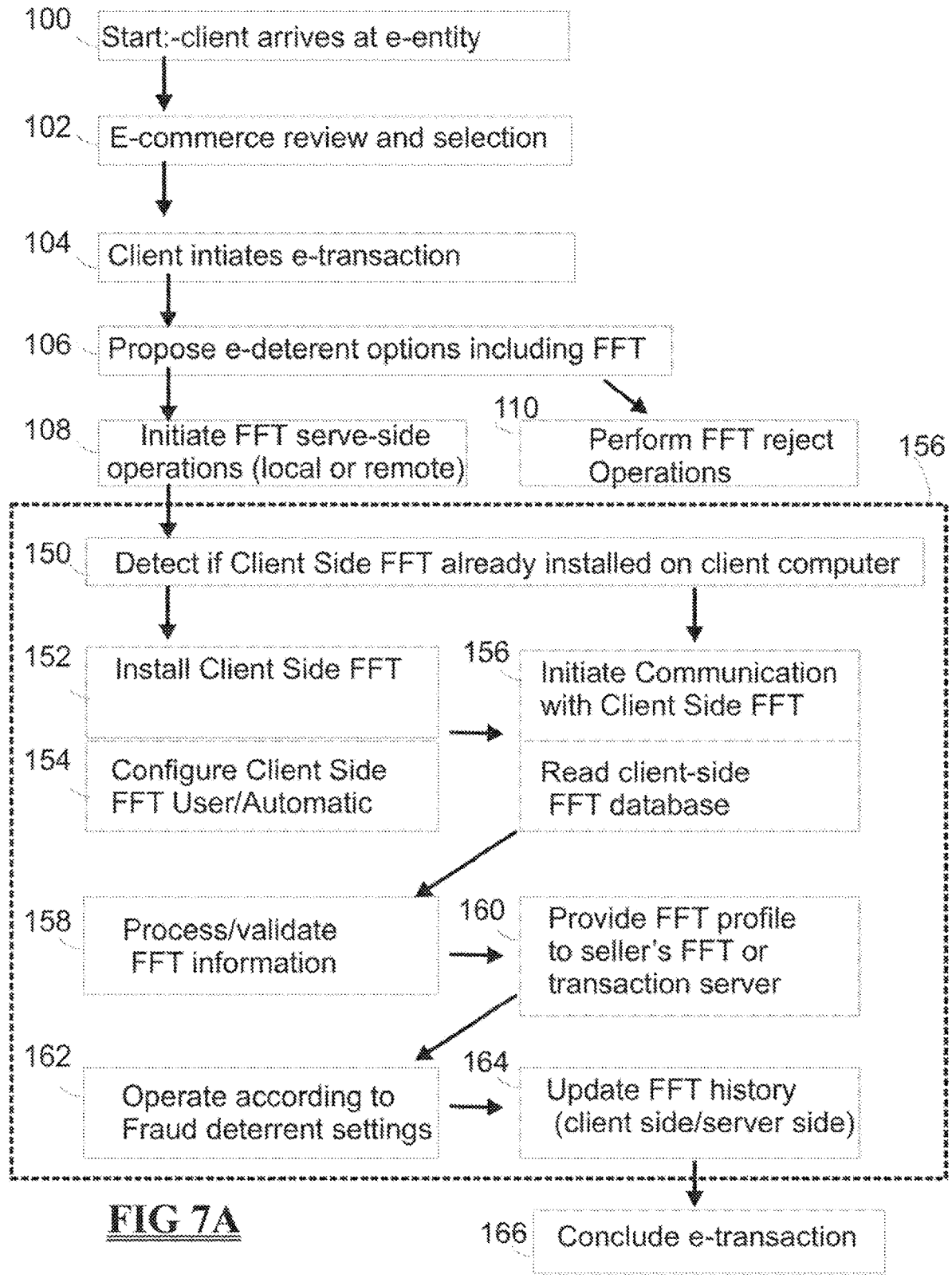
FIG. 7A. illustrates a method of using a fraud free transaction (FFT-server and its components with respect to verifying and installing a client-side FFT application.
Figure 7B:
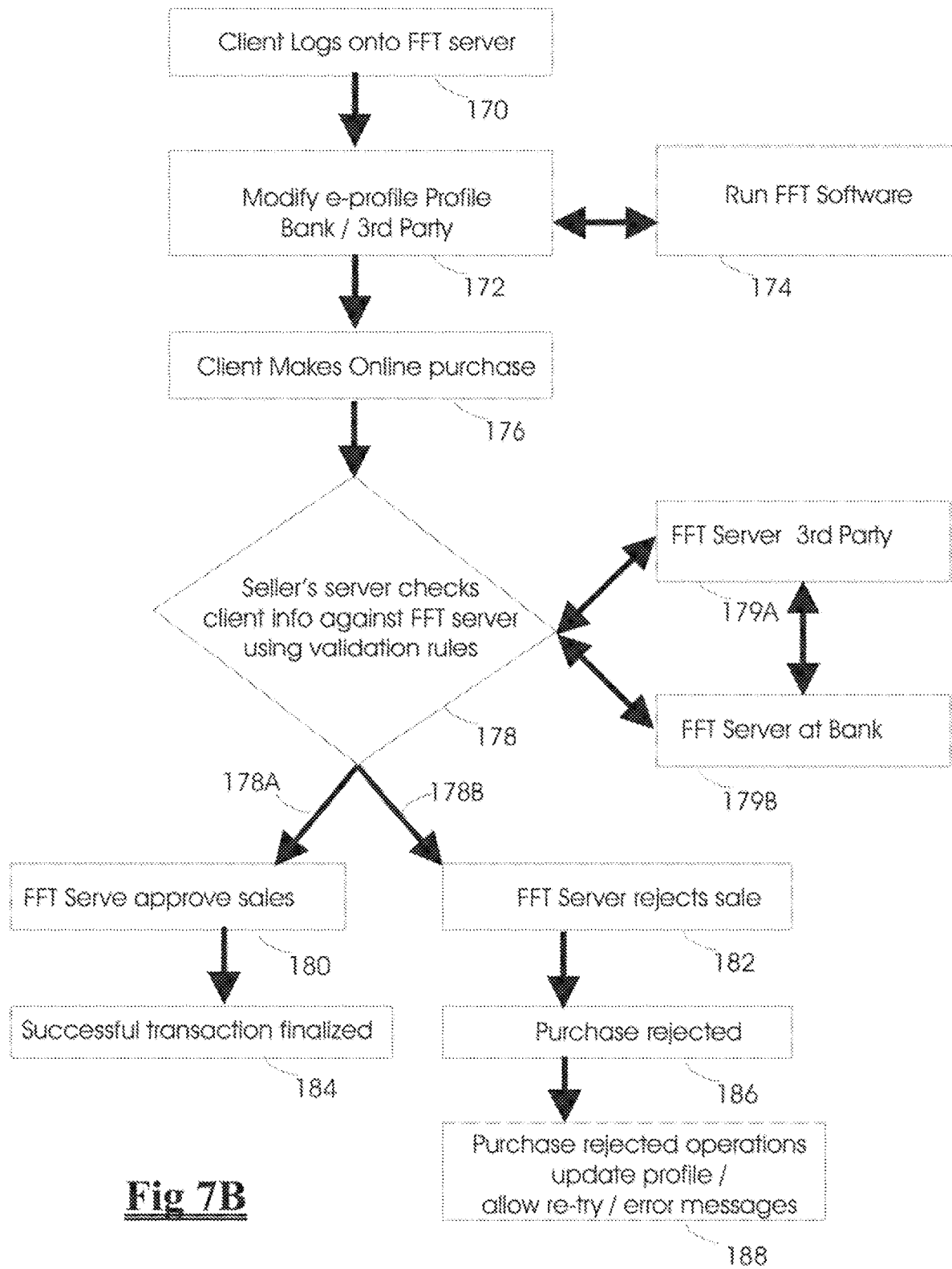
FIG. 7B. illustrates a schematic representation of an FFT method which is implemented according to information and rules set out by a client controlled e-profile and an FFT-participating entity such as a third party or card-issuing bank.

FIG. 7A and FIG. 7B teach preferred embodiments of the invention, FIG. 7A illustrates a method of using a fraud free transaction-server and its components in which a client-side FFT application is utilized. FIG. 7B illustrates an FFT method which is conducted by the seller or through the card-issuing bank. The examples can rely heavily upon the existence of a client-controlled e-profile which will be reviewed in FIGS. 9A-9C. Rather than fraud free purchase (FFP) system the system may be configured more generally for fraud free transactions (FFT). The FFP and FFT systems are similar except FFT systems are configured for allowing various types of transactions requiring authentication and validation of user identity, such as allowing access to websites and online services, rather than simply payment for goods.

In the first step of FIG. 7A the client's web-browser arrives at an address of an e-entity 100 such as a website which is an established e-store, e-service provider, e-banking site, and the like. In step 102, the client navigates through the e-site reviewing and selecting services or products which will be related to an e-transaction whereby the seller provides the client with a desired result such as access to a digital-good or e-service. In step 104 the client initiates an e-transaction by indicating (via a mouse click) that, the e-transaction should occur (e.g. a software purchase will be made, access will be requested for something like e-banking, or an e-service such as a web-based e-mail or word-processing program). In step 106 the user is provided with a choice about whether to conduct the transaction as a Fraud Free Transaction member. If the user rejects this possibility then FFT reject operations 110 occur as defined by the seller's server 10 such as asking if the client would reconsider the choice, imposing a delay upon the finalization of the transaction, etc.

Figure 8:
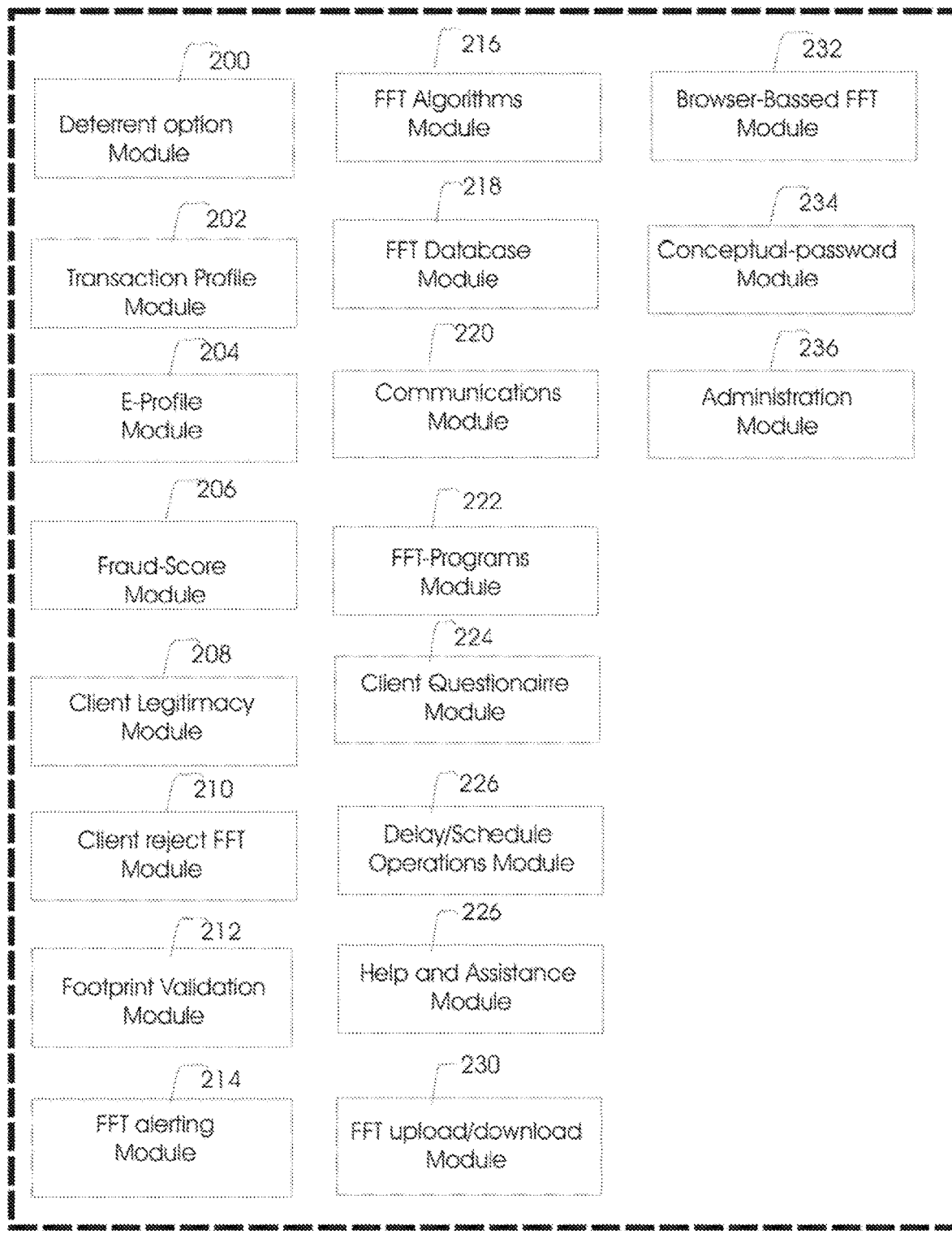
FIG. 8. illustrates the modules of an FFT server-side application.

In step 108 the FFT-server operations are initiated which can entail a number of fraud deterrent options, however, in this case using FFT-client side software will be selected as can be done using module 230 of FIG. 8 or step 118 of FIG. 2. The steps provided by step 1118 may include activating FFT software modules on the seller's server or initiating communication between the seller's server and an FFT server of a third party which offers an FFT service so that the operations of the FFT-client side applications may be implemented. In one embodiment the FFT service may be one or more services to which the client is registered (e.g. a service called E-Trust, which is run by a major bank). Whether accomplished by the seller's server, a bank or other third party provider the next step 150 is to assess if the FFT-program is present on the client's computer. If the FFT program has not been installed previously, then this may be done in step 152. In addition to installation of the FFT software, the FFT can be configured 154 automatically or according to user, bank, or seller preference. The configuration can include FFT operating parameters including whether to install as an active system process or not, whether to load the FFT program at least once as a system process if the computer is restarted between certain dates, a length of time after which the FFT program will automatically remove itself, a length of time after which the FFT program will check to see if the product has been paid for or if a chargeback has occurred. In step 156 the FFT server initiates communication with the client-side FFT. This may include launching the FFT client-side program if it is not activated as a system process. Once the FFT client side program is active, step 156 can include running the FFT program to derive client profile including reviewing the client-side FFT history table, deriving the computer, operating system, and device (e.g., hard-drive) identification numbers or serial codes. The FFT client side-database can contain e-transaction history:

The next step 158 is to process and validate FFT information. For example, the FFT server can validate the clients FFT history, by checking to see if information in the FFT history matches the data it has in its own FFT database 218. For example, if the FFT client-side program's database or transaction-history module indicates that the client previously purchased a certain type of software and paid for it successfully, then a transaction number associated with that purchase can be used to lookup that same transaction on the FFT server and, by way of cross-reference, determine if the two pieces of information match. Alternatively, if the purchase was made from a third party, then the FFT server can contact the server of the other party and send the transaction number along with the transaction details. The server of the third party can then verify or refute the information about that transaction. Step 158 can include using transaction numbers to determine if the data in the FFT client-side database is correct or incorrect. The validation process will also check and crosscheck the client's computer, operating, hard-drive ID number against its FFT server database to obtain any information about the client from previous FFT installations. Accordingly, even if a client removes the FFT program from their computer or if the computer crashes, a client's FFT information from prior installs can be accessed and utilized as part of the e-transaction fraud review process. A client's FFT history may also include how many times the FFT has been run, has been removed or allowed to self-remove, how many times a downloaded software program has been used and for how long, past purchases with the same credit card information, mailing address, etc. Thus an FFT profile can be created and may become part of the transaction profile with respect to determination for the fraud score. When a third party FFT server is used it may provide different types of information to a seller's server. For example, if the seller's server is trusted by the third party's FFT server then it will give the information (which may be fraud occurrences represented in percentage of total, in number of occurrences, or as a normalized fraud value for that item) in column 2 whereas an unknown seller may only be sent the information in column number 1. These distinctions are shown in Table 4 of FIG. 3B.

In step 160 the FFT server provides FFT information to seller's FFT server or seller's transaction server. In step 162 the e-transaction occurs according to the seller's fraud deterrent algorithms and options which can use a fraud score supplied by the third party FFT server, or which can calculate its own fraud score from the various fraud values generated for the different items of the FFT profile that was generated. In step 164, the FFT history is updated on both the FFT server and the FFT client side program. Lastly in step 166, the e-transaction is ultimately concluded with the client either obtaining or being refused the e-product or service which was the object of the transaction.

In FIG. 7B, an FFT-method is shown in which a client-created and controlled e-profile is relied upon. In step 170 the client logs onto a platform which uses an FFT-server which is configured for allowing client's to modify their e-profiles. The FFT-server is preferably operated by an entity with which the client has banking or VISA accounts. In step 172 the client can modify their profile in a number of manners, including, for example, allowing a particular e-entity the right to charge their credit cards, allowing an e-entity to charge the card over a specified period (e.g. over the following 2 days during which the client will be on vacation and away from their authorized computer), as well as setting limits for this client's cards, or allowing, rejecting, or adjusting other features of their profile such as those disclosed in FIGS. 9A-9C. If the client wishes to require that electronic orders can be placed only from devices having specified identification numbers, then the client can operate FFT-related software 174 which is configured to obtain specified information from the client's device so that it is registered. The client may also chose the order of FFT-validation operations such as selecting a process by which if the client doesn't respond via a client-side FFT program then the client is contacted (via voice or textual means) at a specified cellular phone-number. Such out of band confirmation may also require the client to give a verbal or text-based password. At a subsequent time, when the client visits a seller's website and initiates an e-transaction 176, then the seller's server will validate the information supplied by the client (e.g. a shipping address) against the client's e-profile information, which resides either on the seller's FFT-server (such as the client's bank), with the FFT-server operated by a client's credit/debit-card provider or bank 179a or with the FFT-server operated by a different third party 179b. The validation process 178 can utilize rules defined by the FFT-server, the client's e-profile, the seller's requirement, or a combination of all of these. If the validation is successful 178a then the e-transaction is approved 180 and the finalized 184 by providing confirmation numbers, notices of terms and conditions, and the like. The step of finalization 184 can include operations such as updating the information in a seller's FFT-server, the client-side FFT application, and the FFT-server of any third parties that participated in the transaction. The step of finalization 184, can also include providing the goods or services paid for by the client, or scheduling these to be delivered, as well as adjusting parameters related to post-transaction validation and verification, which can occur as scheduled events at selected times. In the case where validation fails 178B, and the FFT-server rejects the e-transaction 182, and transaction rejection operations occur 188. Transaction rejection operations 188 can include notifying the client of this rejection, directing the client to a customer service representative, allowing a re-attempt for the transaction, displaying error messages or "server outage" messages to deter the client from knowing that a fraudulent attempt has been detected, and other operations as well. The information of the FFT-server is obviously updated as well to reflect this failed attempt, and counters or flags related to fraud may be adjusted in the FFT-server. Step 178 can also be replaced by step 178 in which a card-issuing bank receives a transaction request from a seller (in step 176) and processes this request by contacting a client using an FFT-server side application to contact the client's client-side application in order to validate the transaction. In this case step 188' includes the bank accepting or rejecting the transaction based upon the client's interaction with the client-side program and sending this decision onward to the seller. Steps 178' and 188' are not shown in the figure.

In FIG. 7B, step 170 can be incorporated in into a shopping cart process and can occur in a sub-window provided by a seller's FFT-server, or can occur by having the seller's FFT-server redirect the client to a third party FFT-server that is configured to operate jointly with the seller's FFT-server (e.g., by way of an FFT-application run on the sellers server). In this case step 176 entails returning the client back to the shopping cart to reconfirm and continue the transaction. The steps of this method can be adjusted, repeated, and performed in a different order in order to provide convenient and user friendly implementation of the fraud-deterrent features which utilize rules (that maybe at least partially user defined) to assess information provided by the client in relation to a customized e-profile which contains preferences and information that are under the client's control.

FIG. 8 illustrates an FFT server-side application 12, running on an FFT-server, and its components which function in manners that have been at least partially described herein, but are reviewed with respect to a preferred embodiment. The modules 200-216 each contain algorithms, rules, software codes, and parameter values which allow the different modules to accomplish their operations. Operations associated with a particular module can be accomplished jointly in cooperation with other modules, but are associated with particular modules in this disclosure for the purpose of illustration. Operations described may occur independently, jointly, or wholly within the FFT client-side applications with which the FFT-server side application communicates, and the system is realized so that the FFT-server side application can communicate with multiple FFT client-side applications operate to jointly provide the systems and methods of the current invention.

The FFT-deterrent module 200 enables fraud deterrent options and features to be selected and presented to the client. The preferences for FFT client-side screens (e.g. FIG. 10B) used for various clients can be stored in this module.

The transaction profile module 202 enables creation, communication, modification, validation, and assessment of the transaction profile as well as implementation of operations related to the transaction profile.

The e-profile module 204 enables creation, communication, modification, validation, and assessment, of the e-profile profile as well as implementation of operations related to the e-profile.

The fraud-score module 206 provides calculation and adjustment of fraud scores that may be used to select fraud deterrent features and operations.

The client-legitimacy module 208 provides the assessment of a client's legitimacy and can include routines for assessing, for example, whether a client is using a proxy server.

The client-reject FFT module 210 provides operations related to what occurs when a client reject the use of FFT in the transaction, and can also implement processes related to what occurs when the FFT rejects a transaction initiated by the client.

The footprint validation module 212 provides operations related to obtaining, evaluating, comparing and contrasting information defining internal and external footprints.

The FFT-alerting module 214 provides operations related to alerting various parties of activities that are defined as being related to fraud, such as customer service representatives who may have to manually review the purchase prior to approval.

The FFT algorithms module 216 provides various FFT-algorithms which are related to fraud detection and prevention, such as providing anti-fraud analytics according to various strategies.

The database module 218 provides operations related to storing, searching, retrieving, and adjusting all historical and reference information and FFT-related activity and logs.

The communication module 220 provides operations related to communicating with the client, the seller, and any third party relevant to an e-transaction and can include implementation of out-of-band communication and various in-band alternative communications such as communicating with the client via a third party service or community such as FFT module on a service such as Facebook. The communication module also handles all communication between card associations, banks, sellers, clients or other parties that may be participating in the e-transaction.

The FFT programs module 222 serves to coordinate and control all the other modules of the server according to one or more FFT programs which has been selected by the FFT-server administrator.

The client questionnaire module 224 provides operations related to the generation, presentation, validation, and processing of questionnaires and fields which are presented to the client.

The delay-schedule operations module 226 provides operations related to scheduled events such as recurring billing, post-payment validation and billing, setting e-mail notification and reminders or out of band communication and the like.

The help and assistance module 228 provides operations related to providing clients/users with help and assistance such as information related to various features as connecting clients with customer service agents either via phone, chat lines, or e-mail.

The FFT upload/download module 230 provides an upload/download operations and software modules that FFT' clients can upload and install, and also controls encryption, and version, and license control for client-side FFT applications. This module can also check for previous installations of the client-side FFT application, can receive and send image data related to realizing conceptual passwords, can obtain multi-media information sent by a client such as may occur when a client interacts using a web-camera with a customer service representative.

The browser-based FFT module 232 provides operations related to establishing communication or validating an FFT browser configured to provide a secure and FFT-enabled e-transaction, or FFT-browser modules that may be implemented within existing browsers and toolbars.

The conceptual password module 234 provides operations related to generating, adjusting, and presenting conceptual password screens and validating a user's entries as well as allowing users to manage, define, and cancel partial or entire picture sets.

The administration module 236 provides the FFT-administrator with a user-friendly interface screens for adjusting the operation of the FFT-program.

Figure 10A:
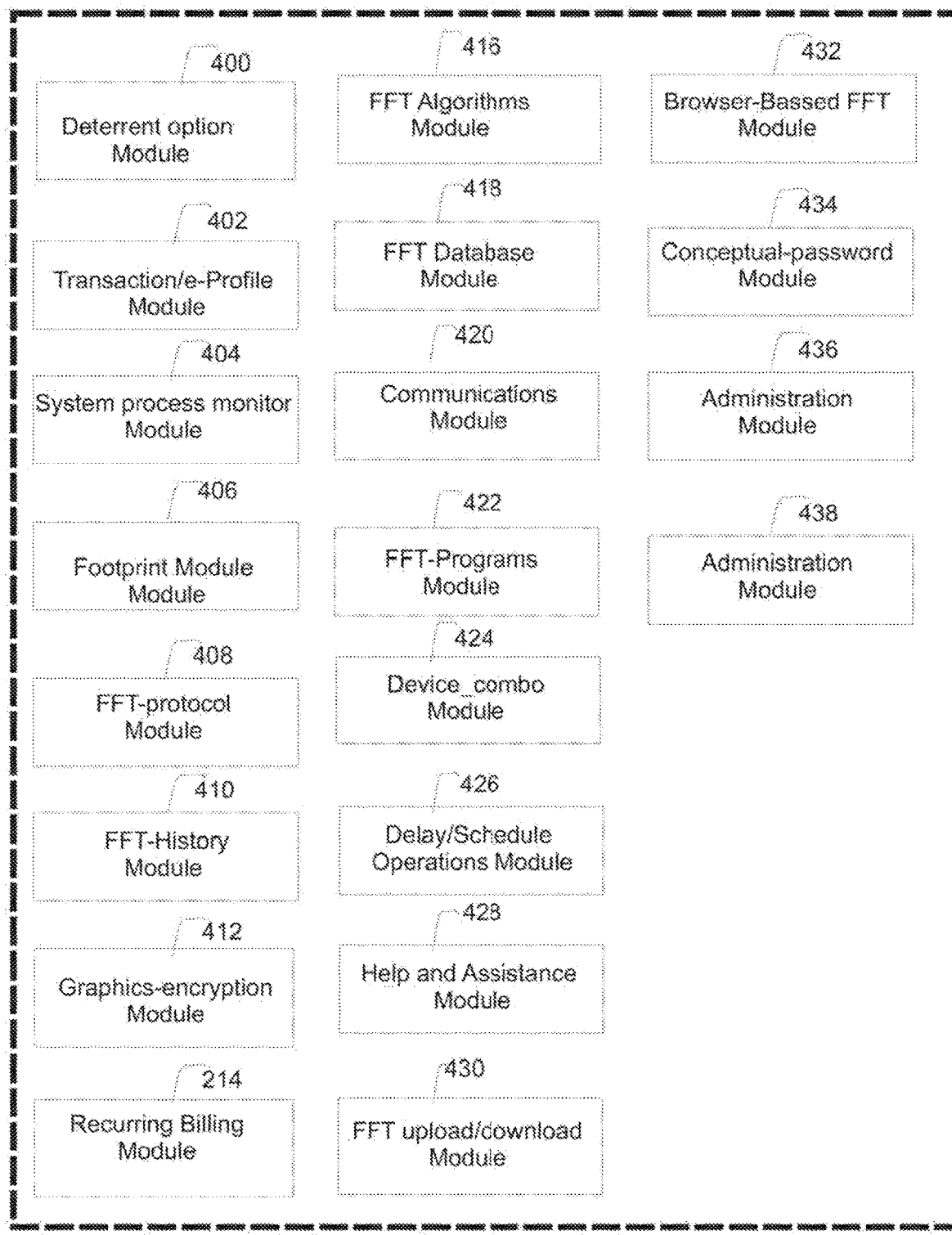
FIG. 10A. illustrates the modules of an FFT-client side application.

FIG. 10A illustrates an FFT client-side application 401, running on a client's computer, and its components which function in manners that have been at least partially described herein, but are reviewed with respect to a preferred embodiment. The modules 400-436 each contain algorithms, rules, software codes, and parameter values which allow the different modules to accomplish, their operations. Operations associated with a particular module can be accomplished jointly in cooperation with other modules, but are associated with particular modules in this disclosure for the purpose of illustration. Operations described may occur independently, jointly, or wholly within FFT client-side applications with which the FFT-server side application communicates, and the system is realized so that the FFT-server side application and multiple FFT client-side applications operate to jointly provide the systems and methods of the current invention.

The FFT-deterrent module 400 enables fraud deterrent options and features to be selected and presented to the client. The preferences for FFT client-side screens (e.g. FIG. 10B) used for various clients can be stored in this module on the local or server FFT program.

The transaction profile module 402 enables creation, communication, modification, validation, and assessment of the transaction profile as well as implementation of operations related to the transaction profile.

The system processes monitor 404 enables monitoring of system processes and program execution with respect to software product that have been purchased using the FFT system.

The footprint module 406 provides calculation of a client's internal footprint.

The FFT protocol module 40S enables the client or remote server to modify FFT operations and features which will occur during transactions.

The FFT history module 410 records, transmits, and presents historical transaction activity to the client and may be password or otherwise protected.

The Graphics/encryption module 412 provides operations storage and presentation of graphical images that are used during, various FFT operations.

The recurring billing module 414 provides operations related to scheduling, alerting, and confirming events related to recurring billing and may also function to enable and disable features of programs on the client's computer according to charge-back and recurring billing activity.

The FFT algorithms module 416 provides various FFT-algorithms which are related to fraud detection and prevention, such as providing anti-fraud analytics according to various strategies.

The database module 418 provides operations related to storing, searching, retrieving, and adjusting all historical and reference information and FFT-related activity and logs.

The communication module 420 provides operations related to communication between the client the FFT server, other client-side FFT programs that have been registered by the client on other computers, and other parties that may be participating in the e-transaction.

The FFT programs module 422 serves to coordinate and control all the other modules of the server according to one or more FFT programs which has been selected, by the FFT-server administrator and/or the client.

The FFT-deterrent module 424 provides operations related to the generation, presentation, validation, and processing of questionnaires and fields which are presented to the client.

The delay-schedule operations module 426 provides operations related to scheduled events such as recurring billing, post-payment validation and billing, setting e-mail notification and reminders or out of hand communication and the like.

The help and assistance module 428 provides operations related to providing, clients/users with help and assistance such as information related to various features as connecting clients with customer service agents either via phone, chat lines, or e-mail.

The FFT upload/download module 430 provides an upload/download operations and software modules that FFT clients can upload and install, and also aids in controlling encryption, and version, and license control for client-side FFT applications. This module can also receive and send image data related to realizing conceptual passwords, can obtain or send multi-media information sent by the FFT-server, such as may occur when a client interacts using a web-camera with a customer service representative.

The browser-based FFT module 432 provides operations related to establishing communication or validating an FFT browser configured to provide a secure and FFT-enabled e-transaction, or FFT-browser modules that may be implemented within existing browsers and toolbars.

The conceptual password module 434 provides operations related to generating, adjusting, and presenting conceptual password screens and validating a user's entries as well as allowing users to manage, define, and cancel partial or entire picture sets.

The administration module 436 provides the FFT-administrator or client with a user-friendly interface screens for adjusting the operation of the client-side FFT-program.

FFT Client-Side Features

Figure 10B:
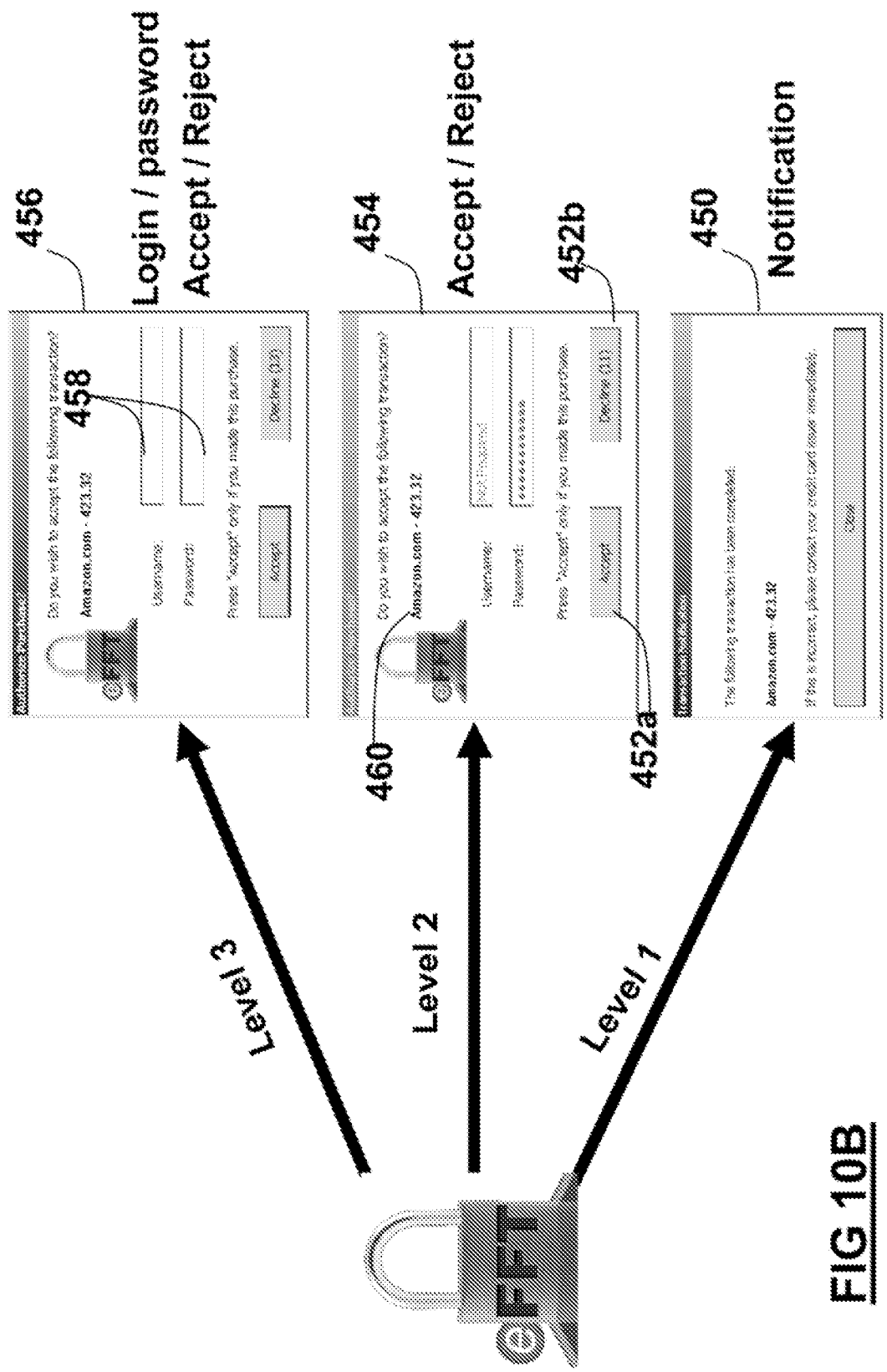
FIG. 10B. illustrates 3 examples of types of FFT-client side authentication windows.

FIG. 10B, illustrates 3 examples of types of FFT-client side authentication implementations. In a preferred embodiment these implementations are invoked in response to a bank receiving a transaction request during an e-transaction. The bank can tell, that the transaction is from an online-source due to part of the transaction code (which is known as an electronic commerce indicator-ECI) which is sent by a card-acquirer. There are three levels of security illustrated. In the first level the FFT-server of the bank sends a command to the client's FFT program to simply present a notification 450 to the client that the transaction has occurred. This notification will remain on the client's computer until the client presses the button labeled "close". If the client's registered device is not on, and the FFT-server can not contact the client side-FFT program then the transaction can be automatically rejected since it is unlikely that the client will be conducting an e-transaction if the registered device is not even on. Alternatively, the client may be conducting the transaction from a different computer and if the client has defined an alternative validation method such as an out-of-band contact or confirmation method, rather than being automatically rejected the transaction result in this type of out-of-band activity. The accept/reject popup 454 can also be utilized wherein the e-transaction is not allowed until the client actively accepts the transaction via button 452a. The transaction can be rejected if the client presses button 452b, or if the timer on that button reaches zero-seconds (in the figure the client has 11 seconds remaining). In the login/password accept/reject popup 456, the client must enter a password, or a username and password into information fields 458 prior to providing an accept or reject response, and prior to the timer on the reject response button timing out (in the figure the client has 13 seconds remaining).

FIG. 10C. illustrates an example of an FFT-client side application of a conceptual password. In this example the picture set is made of images 464a that have been uploaded by a client. In this case the conceptual password is defined as scientists whose research includes personally determining the regional sources of brain activity (rather than having research assistants do this for them). This is obviously a very difficult rule to follow for anyone except the client who defined this set. The presented conceptual password set 462a is becomes the solved password set 462b when the client selects the images which have been defined as "hits" 464b. The message 466 which accompanies the conceptual password can include information about the transaction which is being processed and the "decline" button may include a timer which counts down the remaining time for the client to provide a response before the transaction is rejected. Upon subsequent iterations of this conceptual password the images which are presented to the client can be presented in a different order an may contain different images for the "hits" and "misses" which were previously defined by the client. Accordingly even if a fraudster records this activity or views the client's response it is of little use since the images will be different on a subsequent presentation.

Secure Adjustable Client Profile (SACOP)

In one embodiment the FFT systems and methods may utilize an online e-profile which includes client adjusted preferences and information that are used during FFT operations. The e-profile may be stored on a FFT server provided by either a third party FFT service or by a client's banking or credit card institution. The e-profile can include billing and shipping addresses associated with a credit card so that clients can allow items to be shipped to more than their billing address. The e-profile may also include information related to computers which are authorized for use with the client's credit card so that e-transactions must be made using a particular computer with a particular credit card. The e-profile can also include spending limits for online spending, or spending limits related to charges related to particular websites. The limits may be related to an amount, a duration during which a transaction will be allowed to occur, a website or client which is blocked from providing charges with the card. This type of fraud solution requires the active participation of the client, and may require such extra activity as setting up an e-profile and/or installing FFT software on a personal computer. Users obtain increased flexibility and security in their online transactions.

The e-profile can also include preference for validation of the client. Validation rules determine what operations occur during the client's verification by a third party. For example, validation rules may require that a client's name, credit card number, shipping address, and computer ID numbers or computer name correspond to the values provided in their e-profile. Although validation rules can be set by the client, an online purchaser may utilize validation rules that require either more or less information than the client has set. In this case one method of reconciliation is that the two validation rule sets are combined so that all the necessary information is provided. This can occur by providing a customized and dynamic webpage which is created during an online purchase and which requests information from the client during a purchase. The online profile can use validation rules to also determine a number of manners in which a purchase can be validated. The client may require only that the FFT service be used or may further require a manually accomplished FFT method. One example of a manual FFT service method is a method in which the client must log onto the FFT service and manually allow or reject a purchase. A second example of a manual-based FFT service would require that the client confirm a message or voice-based call that is sent, for example, to their PDA or cellular phone and this step may also require that they provide a secret text code (or verbal password) in order to confirm the purchase. This method may be particularly attractive for parents who are monitoring their early-adult children's spending and who may wish to have the ability to accept or reject purchases in a flexible and real-time manner. A third manual-based FFT service method would require that the client obtain a confirmation code from a seller and then enter this code and the amount of the charge in order for the transaction to occur. These features provide benefits, flexibility and increased, security for not only for the clients and the vendors but also for the credit card companies and banks themselves.

Just as an e-profile may be stored on a FFT server provided by either a third party FFT service or by a client's banking or credit card institution, the information relayed from the client may be processed by the seller, a third party FFT service, or a client's financial institution. While the shipping address may be provided to the seller, the client's computer number may only be transmitted to entities trusted by the client. A number of methods may be used to differentially send validation information to two different parties either in parallel or serial steps which occur during the e-transaction.

As shown in FIG. 9A, a client can log onto the FFT server using a web-based interface 254 and can adjust features of the e-profile 264 such as adding a primary or additional shipping address (e.g. a family member's address where a gift is to be shipped), which is different than their home address, so that goods may also be shipped to this address. Additionally, clients may run FFT client-side software operations (e.g. as can be invoked as part of the client choosing the "view/modify computer ID info" option) which will obtain identification numbers for their computer's operating system or computer ID number (e.g. hard drive serial number) so that e-transactions may only be made from their computer. The FFT client side software can be software that remains on their computer and is accessed by the user from time to time, or may be a program which is loaded at startup, such as a system tray component, or may be a web-based lava applet which is installed as a plug-in and associated toolbar, for the client's web-browser application, or which runs over the internet and requires that the user click to provide it with permission for obtaining information from the client's computer and network. In this tatter case, software may be run from a remote location and nothing need be installed on the client's computer. In any case, at the time of a subsequent e-transaction 176 similar software operation will occur to re-check this computer specific information. After an e-profile has been created 172, the client may go to any online store that is configured to interact with the FFT system and will be allowed to make a secure FFT purchase according to validation rules. As stated, if the validation rule requires information about the client's computer, then client side FFT operations can be run from a client-side program, checking for the FFT program residing in the system tray, or using a browser plug-in. In any case, when the client makes their online purchase clicking to complete a transaction 176 an FFT server validates the transaction 178. If the FFT server is located with the seller, then the seller (e.g a bank) may approve 178A or reject 178B the transaction. The seller may also wait as the FFT server of a third party 179A or which may be a bank 179B verifies the information. If the third party is not a bank 179A, the server of the third party may communicate with the FFT server of a bank and this result will then be routed through the third party and back to the seller. These steps can occur in a transparent fashion with respect to the client and seller. In the case where a transaction is approved 180 the transaction ion is finalized, successfully, otherwise the transaction can be rejected 182 and appropriate actions occur which may include fraud alerting activities if certain types of rejections are detected at more than a specified rate of occurrence.

In FIG. 9A web-based interface is shown which can be used to modify the client profile disclosed in FIG. 7B and elsewhere, in this application. The client can access the interface by going to an FFT related website 250 such as their bank or credit card service homepage and logging in with their login and password information 252. After initially setting up the service, a client may be required to perform subsequent logon's only from the registered computer, and may only register additional computers by performing highly secure operations such as, for example, by obtaining a token from their service which can be used once, within a specified amount of time, to register a second computer. Upon successful login they can be provided with an administration window 254 having a set of choices which are presented on sub-windows that are related to traditional banking 256 and to the FFT service 258. Although the menu items of window 258 are separate, these may all be combined within different sections of the e-profile, and more or less items are possible. The user may select a radio-button 264 by clicking on an empty radio-button of any of the items on either window and then choose to continue 260 in order to implement the option. Selecting the "View/adjust e-profile" allows them to do so and can invoke a e-profile view-adjust screen 266 such as that shown in FIG. 9B. In FIG. 9B the client is able to modify aspects of their e-profile including shipping and billing addresses. If the client wishes to add computer information then this may be done either by manually entering the information or by running an FFT software module which finds this information on the client's computer and sends it back to the FFT server in an encrypted fashion. The client may also set/modify limits for e-transactions including those specific to spending limits, blocking/accepting charges from specific websites, durations for which certain charges may be made. The "View/modify credit info and users" feature can be used to modify which credit cards are associated with a user's profile (although a separate e-profiles, e-limits, and rules can exist for the same user with several credit cards) and names which might be allowed to charge using selected credit card numbers. Once an item's radio button has been selected, the client is permitted to go back 260A or continue forward 260B using the available navigation buttons 260.

FIG. 9C shows a web-interface in which clients can accept 270 or reject 272 orders such as e-orders which are described in transaction information fields 274 which can include the transaction number, date, amount, seller, as well as a description of the item or service purchased. Unlike a conventional credit-card statement, these are pending transactions rather than historical purchase records and these do not become official until the client makes an approve selection 270. An alternative method of validation is also shown in which the client must provide a transaction code 276 provided by the seller and the amount of the transaction 278 in order to confirm a payment 280. The transaction code may be provided by the seller at the time of transaction or may be sent at a date following the transaction (e.g. this may be mailed or verbally provided to the client). Alternatively, a client can allow these transactions before these actually occur by defining e-entities with whom the client intends to transact over a limited future period.

Returning to FIG. 9A, the client may also be able to change e-passwords used for logging into the FFT server or used to confirm FFT transactions for various websites or credit cards. It is also possible for a client to change the FFT level which is used, wherein higher FFT levels may set different operations to occur during an FFT transaction. For example, the FFT level may be set to be 'medium' or 'high' where 'low FFT level' permits the current e-profile to be used, while a 'high FFT level' may require that any e-seller either call, webcam, or otherwise confirm using a real person, the identity of anyone attempting an e-transaction from using the credit card number, to logging into an internet service, to using a digital rights media product. Reversion to a "high FFT level" may occur if a clients wallet was lost, if there is evidence of attempts a identity theft, or if otherwise fraudulent events have occurred.

The FFT server can use this type of e-profile feature to deter fraudulent use of digital products and software. For example, the client may associate a specific computer in the profile with a particular software program license, such as an internet-based software product which is not installed on the user's computer, but rather is accessed remotely. The software license can be associated with the user in the "e-limits and rules" section of the program. This feature is convenient because if the client wishes to use a remote software module located on a remote server, rather than requiring the user to log into the remote server each time the software needs to be accessed, the computer ID number can be automatically checked by the remote server obviating the need, and related time and effort, for the user to login or memorize various passwords that may be needed for different software packages and provided by different vendors. Further if the client's computer is stolen or broken and a new computer is purchased by the client, the client need only update the client's information in order to begin to use the product again. This feature may be very useful for institutions who are using an institutional e-profile to manage their licenses since as new students enroll their computers may be added to the list of accepted computers while the identification numbers of the computers of departing students are removed using the "e-limits and rules".

Additional Considerations:

Currently over 30 percent of all internet commerce transactions are ultimately rejected or abandoned. Research has clearly shown that when additional steps added to order processing, which slow down order completion or require large amounts of validation information, that a reduction completed orders results, such as occurs during shopping cart abandonment. The present invention provides a number of solutions which should increase legitimate clients' satisfaction levels for e-transactions. The increase in ease, efficiency, automaticity, and flexibility should lead to decrease failures for completion of shopping cart checkout. It is contemplated that the FFT client-side application can be uploaded, installed and configured in less than 2 minutes and post-installation user customization is simply and quick. Once an FFT client-side application is installed, the validation and security features can occur largely in the background and decrease the time and effort of a client by requiring less information be provided on checkout-forms. In fact the FFT client-side application can have "auto-complete" features which work with a seller's website and allow the client, to quickly enter shipping, billing, and other information by having the FFT-application automatically, or semi-automatically, fill in this information. Unlike the "Gator™" applications, the client's information can be accessed from a remote FFT-server so that the client's information is secure and does not need to reside on client's computer. An important feature for the client which is offered adjunctively to the fraud-prevention is a record of activity which provides clients with historical records of their purchase activity in an easy and convenient manner. Further, as with online communities such as that of e-bay, as client's use the FFT-service more, their e-profiles can be adjusted to reflect this activity (as well as history of chargeback), and this can lead to a client becoming increasingly "trusted". Other features of the invention, such as offering multiple fraud-deterrent options and allowing users to modify their e-profile will also greatly increase user control, trust, and satisfaction with e-transactions.

To some extent, pre-charge client authentication can automatically take advantage of checking and cross-checking client related information verify each transaction, including evaluation of chargeback history, geo-targeting, IP address scanning, and real-time verification techniques. However pre-charge scanning has its disadvantages, such as sometimes requesting extensive information from a client. Further, if a client is experiencing difficulty entering, ordering information (e.g. an elderly person) the pre-charge evaluation (e.g. a strategy which relies heavily on 'snapshot' analysis) may evaluate this confusion as attempts at fraud. The FFT process substitutes these types of tedious and manually implemented online verification schemes, automated evaluation such as verifying that a credit card is being used with an order that is emerging from the computer that is authorized to work with that card. The FFT process can function to close the loop of online payment by ultimately requiring that the client confirm the transaction for it to occur.

The FFP deterrent paradigm is able to provide advantages in a number of novel manners. Clients are able to actively play a role in their validation process, for example, by allowing them to choose from or customize multiple authentication options rather than treating all client's in a similar manner. By providing a sub-set of options based upon the type of transaction which is occurring (e.g. the value of an item; the fraud score of a transaction) the fraud deterrent options are appropriate for the transaction taking place. For example, the checkout process for an item which cost $2.00 can be differentially implemented that which occurs when the item is $200, based upon the rules of the transaction profile. The FFT can adaptive and dynamically be applied to the transaction process in a manner which empowers the client and in accordance with a client's preferences. For example, a client who is in a hurry or who is not a good typist may prefer a voice and/or human based purchase, or may have access to a RFID and credit card, which can be used to quickly validate a client's identity. Manufactures and clients are also empowered because they can require deterrent options to be implemented in a graduated and unique manner according to particular characteristics of the transaction.

By permitting installation of the FFP on the client's computer, the client can provide a rapid client profile to be built and subsequently relied upon. Rather than decreasing purchases, the FFP should provide a much more user friendly transaction for a wide assortment of e-based transactions. The FFP not only utilizes novel features, but allows traditional fraud-deterring technologies to be used in a smarter manner. For example, the type of software license or software wrapper that is offered to the client and/or distributed with a digital product may be selected by the FFT-server based upon a client's fraud score. Demonstration software, or particular versions of demonstration software, can only be offered to client's having a particular type of historical e-transaction activity (e.g. a frequency shopper may be offered demonstration software with more options enabled than a client with no software purchases in their FFT-history).

With respect to software purchases specifically, the FFT has particular advantages. Software manufacturers have developed a number of strategies in order to decrease financial loss due to fraudulent activity. For example, software license programs may be distributed with software and may require periodic renewal. However, this may benefit the software company, but not the original seller of the software. For example, a customer may originally decide not to pay for software but may then decide, after illegally using the software for some time, that a "purchase", "update" or "license renewal" is in order since the client has determined that the software is a valuable asset. The customer may not purchase this latter software component from the same seller from which the software was originally downloaded. While the manufacturer will be paid for the software, the seller, who provided the initial download, does not realize revenue from this client's purchase or "renewal" of the item. The FFP architecture of the current invention allows for fraud-free purchases to occur and focuses upon promoting valid sales both during and subsequent to the e-commerce transaction.

While of particular benefit to the sale of software products, the current invention can be easily applied to a wide number of e-commerce transactions, especially with respect to the selling of digital goods such as electronic media, multi-media, media-streaming, licensing, licensing renewals, licensing renewals related to dates, licensing renewals related to number of uses, online access to goods, software, files, and services, logging in to a website; passwords, password activations, password retrievals, and limited use software. E-commerce accomplished using the principle advantages of the fraud deterrents described herein can be applied when the purchased items are distributed using mail or real world delivery methods. Lastly, it should be obvious that the fraud free transaction features and methods described herein can be applied to e-transactions in general including online banking, security trading, and other activity where verification of a client identity and authentication of a client's intentions are important factors relating to both how and if the transaction is accomplished, disrupted, adjusted, or terminated.

The FFT implementation has a number of advantages over current practices of e-commerce. First and foremost it provides the client with a number of options for helping the seller to ensure that the client does not intend a fraudulent purchase. By providing a number of options, a compromise between the client and the seller, or client and the client's bank, is reached. For example, a client may not be comfortable conducting part of the transaction over the phone, may not have access to a web-camera, and may not wish to submit a biometric validation marker. In this case, the FFT allows the client to choose or configure alternative FFT options which the seller or bank is comfortable. Although the seller may prefer a multi-media based transaction, rather than simply offering only a web-cam based transaction option, the user may be allowed to choose 2 or 3 alternative deterrent options which the seller believes is functionally equivalent to the web-cam option, or at least sufficient for permitting the particular e-transaction. In some embodiments, the FFT approach allows the clients to create FFT-based e-profiles, which are similar to community profiles of sites such as "e-bay" or allows increased security of sites such as "pay-pal". However, unlike e-bay and pay-pal, the FFT based approach allows a client centered, and multi-tiered anti-fraud system which can be tailored according to the transaction profile and to a greater extent, the client's preferences. Further, in some instances, the FFT methods permit the client to access or link their pay-pal accounts, e-bay profiles, as part of the transaction process and FFT deterrent options. Services such as PayPal may also implement the FFT solution in order to facilitate client's usage of their service. This has not been possible in prior e-commerce methods, because client's have not been asked to actively participate in fraud-deterrence, for example, by installing a dedicated software platform onto their personal computer.

The presently described embodiments of the fraud deterrent systems and methods offer advantages over prior art. Although modifications and changes may be suggested by those skilled in the art, it is the intention of the inventor to embody within the patent warranted herein all changes and modifications as reasonably and properly come within the scope of their contribution to the art. All prior art cited, including internet address references, are incorporated by reference herein as if recited fully. The titles, headings, and subheadings provided in this specification are provided for organizational purposes only and are not meant to restrict the invention in any way, nor to limit material described in one section from applying to another section as would be apparent to those skilled in the art.

I claim:

1. A method of facilitating fraud prevention in payment processing, said method comprising:

receiving a payment card transaction request of a processor of a merchant device to be remotely electronically authorized by at least one processor of an electronic fraud free transaction (e-FFT) payment card transaction entity containing an e-FFT payment card transaction server computer;

operating the e-FFT payment card transaction server computer for obtaining information relating to the payment card transaction request by a client device associated with an e-profile, the client device having a processor configured for operating according to rules defined by an e-profile that is associated with a client payment card;

obtaining, by the client device access to client data associated with an e-profile, the access being provided by an application installed on the client device for use in electronic transaction processing and authorization determination associated with the client payment card, wherein the access by the application to a set of e-profile data is controlled by client-based rules and preferences of a client and comprises the application accessing the e-profile of the client, and wherein the e-profile data remains unknown to at least one server computer of a payment card processing entity;

evaluating, using information associated with the e-profile, a set of one or more rules associated with the e-profile according to preferences available on the client device, the evaluating to determine whether a payment card transaction is to be electronically authorized, and the evaluating using a set of personal data provided to the client device and to which access is provided for determining whether the payment card transaction is to be electronically authorized, wherein the application is configured for receiving a payment transaction request from the e-FFT payment card transaction server computer, the payment transaction request comprising information related to the payment card transaction, and performing the evaluation based upon the payment transaction request, and where the evaluating compares at least a portion of the information relating to the payment card transaction to at least a portion of the set of e-profile data according to a set of e-profile rules defined for said client device;

providing based upon the evaluating, in response to a request by at least a server computer of a payment card processing entity, an indication of whether the payment card transaction request of a merchant is to be at least one of electronically authorized or rejected; and, allowing or rejecting a transaction based at least partially on an evaluation as to allow or reject the transaction, wherein said e-FFT processor, said client device processor and said processor of said merchant device are separate and distinct.

2. The method of claim 1, wherein the evaluating is performed by the client device.

3. The method of claim 1, wherein the evaluating is performed by the client device and the e-FFT payment card transaction server computer.

4. The method of claim 1, wherein the payment card processing entity is selected to be one of the group of: a bank and a card issuer.

5. The method of claim 1, further comprising registering the client device with the e-profile server to enable the client device to receive the information from the e profile server upon receiving a request from a card transaction server.

6. The method of claim 1, wherein the client device is at least one device which is defined for contacting the client in response to the request for payment card transaction authorization.

7. The method of claim 1, wherein the information relating to the payment card transaction includes one or more information data selected from the group of: the amount of the transaction, the location where transaction has occurred, a vendor who has requested the transaction and a category of goods or service.

8. The method of claim 1 wherein the set of rules associate with an e-profile comprises one or more, selected from the group consisting of: at least one e-profile rule set by the client in the application, at least one e-profile result set by the client at the remote server, at least one e-profile rule that includes information obtained by the electronic device of the client, at least one e-profile rule that includes what information to obtain from the client in order to approve a transaction for a payment card associated with the e-profile, at least one e-profile rule that includes what information to obtain from the client in order to approve a transaction for a payment associated with the payment card.

9. The method of claim 1 wherein the electronic device of the client is a mobile computing device such as a cell phone.

10. The method of claim 1 wherein the electronic device is configured to implement one or more conceptual passwords according to rules the client has previously established.

11. A computer system having a program application for facilitating fraud prevention in payment processing, said computer system comprising:

a server computer with memory for storing rules in an electronic fraud free transaction (e-FFT) payment card transaction entity which can be implemented by a server computer processor for performing a method comprising:

receiving a payment card transaction request of a processor of a merchant device to be remotely electronically authorized by at least one processor of an e-FFT payment card transaction server computer, obtaining information relating to the payment card transaction request by a client device with an associated an e-profile, the client device having a processor configured for operating according to rules defined by a set of e-profile data that is associated with a payment card;

obtaining, by the client device, access to client data associated with the set of e-profile data, the access being provided by an application installed on the client device for use in electronic transaction processing and authorization determination associated with a payment card, wherein the access by the application to the set of e-profile data is controlled by client-based rules and preferences of the client and comprises the application accessing the e-profile of the client, and wherein the set of e-profile data remains unknown to at least one server computer of a payment card processing entity;

evaluating, using information associated with the set of e-profile data, a set of one or more rules associated with the set of e-profile data according to preferences available on the client device, the evaluating to determine whether the payment card transaction is to be electronically authorized, and the evaluating, using a set of personal data provided to the client device and to which access is provided for determining whether the payment card transaction is to be electronically authorized, wherein the application is configured for receiving the payment transaction request from the e-FFT payment card transaction server computer, the payment transaction request comprising information related to the payment card transaction, and performing the evaluation based upon the transaction request, and where the evaluating compares at least some of the information relating to the payment card transaction to at least some of the set of e-profile data according to the e-profile rules;

providing based upon the evaluating, in response to the request by at least the server computer of a payment card processing entity, an indication of whether the payment card transaction is to be at least one of electronically authorized or rejected; and, allowing or rejecting the transaction based at least partially on an evaluation as to allow or reject the transaction, wherein said e-FFT processor, said client device processor and said processor of said merchant device are separate and distinct.

12. The computer system of claim 11, wherein the evaluating is performed by the client device.

13. The computer system of claim 11, wherein the evaluating is performed by the client device and the e-FFT payment card transaction server computer.

14. The computer system of claim 11, wherein the payment card processing entity is selected to be one of the group of: a bank and a card issuer.

15. The computer system of claim 11, further configured for providing for registering the client device with the e-profile server to enable the client device to receive the information from the e-profile server upon receiving a request from a card transaction server.

16. The computer system of claim 11, wherein the client device is at least one device which is defined for contacting the client in response to the request for a payment card transaction authorization.

17. The computer system of claim 11, wherein the information relating to the payment card transaction includes one or more information data selected from the group of: the amount of the transaction, the location where the transaction has occurred, a vendor who has requested the transaction, and a category of goods or service.

18. The computer system of claim 11, wherein the set of rules associate with an e-profile comprises one or more selected from the group consisting of: at least one e-profile rule set by the client in the application, at least one e-profile result set by the client at the remote server, at least one e-profile rule that includes information obtained by the electronic device of the client, at least one e-profile rule that includes what information to obtain from the client in order to approve a transaction for a payment card associated with the e-profile, at least one e-profile rule that includes what information to obtain from the client in order to approve a transaction for a payment associated with the payment card.

19. The computer system of claim 11, wherein the electronic device of the client is a mobile computing device selected from the group of a cell phone, or a lap-top computer.

\* \* \* \* \*

UNITED STATES PATENT AND TRADEMARK OFFICE
CERTIFICATE OF CORRECTION

| | |
|---|---|
| PATENT NO. | : 10,949,851 B2 |
| APPLICATION NO. | : 15/404184 |
| DATED | : March 16, 2021 |
| INVENTOR(S) | : Michael Sasha John et al. |

It is certified that error appears in the above-identified patent and that said Letters Patent is hereby corrected as shown below:

In the Specification

Column 1, Lines 17-18:
After "60/977,375 filed on"
Delete "Oct. 2, 2007" and
Insert -- Oct. 4, 2007 --.

In the Claims

Column 41, Line 50, Claim 8:
After "The method of claim 1 wherein the set of rules"
Delete "associate" and
Insert -- associated --.

Column 43, Line 15, Claim 18:
After "The method of claim 1 wherein the set of rules"
Delete "associate" and
Insert -- associated --.

Signed and Sealed this
Third Day of January, 2023

Katherine Kelly Vidal
*Director of the United States Patent and Trademark Office*